United States Patent [19]
Richards et al.

[11] Patent Number: 5,121,469
[45] Date of Patent: Jun. 9, 1992

[54] METHOD AND APPARATUS FOR PROCESSING AND DISPLAYING MULTIVARIATE TIME SERIES DATA

[75] Inventors: Paul T. Richards, Melbourne, Fla.; Robert L. Glassberg, Middle Island, N.Y.

[73] Assignee: Grumman Aerospace Corporation, Bethpage, N.Y.

[21] Appl. No.: 325,694
[22] Filed: Jun. 20, 1989
[51] Int. Cl.$^5$ .......................................... G06F 15/626
[52] U.S. Cl. .................. 395/129; 395/118; 340/747; 340/732
[58] Field of Search ... 364/521, 518, 522, 200 MS File, 364/900 MS File; 340/706, 724, 747, 750, 732; 382/56

[56] References Cited

U.S. PATENT DOCUMENTS

| | | |
|---|---|---|
| 3,418,459 | 12/1968 | Purdy et al. |
| 3,534,396 | 10/1970 | Hart et al. |
| 3,621,214 | 11/1971 | Romney |
| 3,636,250 | 1/1972 | Haeff |
| 4,127,849 | 11/1978 | Okor |
| 4,156,237 | 5/1979 | Okada et al. |
| 4,189,743 | 2/1980 | Schure et al. |
| 4,200,867 | 4/1980 | Hill |
| 4,225,861 | 9/1980 | Langdon, Jr. et al. |
| 4,475,104 | 10/1984 | Shen |
| 4,490,797 | 12/1984 | Staggs et al. |
| 4,710,763 | 12/1987 | Franke et al. ........................ 340/723 |
| 4,712,185 | 12/1987 | Aoki .................................... 364/518 |
| 4,719,584 | 1/1988 | Rue et al. ............................. 364/516 |

OTHER PUBLICATIONS

Andrews, D. F., "Plots of High Dimensional Data," Biometrics, vol. 28, Mar. 1972, p. 125.

Cleveland, W. S., and McGill, R., "Graphical Perception:Theory, Experimentation, and Application to the Development of Graphical Methods," *Journal of American Statistical Association*, vol. 79, No. 387, Nov. 1984, p. 531.

Cleveland, W. S., and McGill, R., "The Many Faces of a Scatterplot," *Journal of the American Statistical Association*, vol. 79, No. 388, Dec. 1984, p. 807.

Buchanan, M. D., "Effective Utilization of Color in Multidimensional Data Presentations," *SPIE vol. 199 Advances in Display Technology* (1979), p. 9.

Chernoff, H., "The Use of Faces to Represent Points in k-dimensional Space Graphically," *Journal of the American Statistical Association*, vol. 68, No. 342, Jun. 1973, p. 361.

Crick, F. H. C., "Thinking about the Brain," *Scientific American*, Sep. 1979, p. 219.

Kolata, G., "Computer Graphics Comes to Statistics," *Science*, vol. 217, Sep. 1982, p. 919.

Mezrich, J. J., Frysinger, S., and Slivjanovski, R., "Dynamic Rrepresentation of Multivariate Time Series Data," *Journal of the American Statistical Association* vol. 79, No. 385 1984, p. 34.

Samet, M. G., "Development of Innovative Graphic Symbology for Aiding Tactical Decision Making" Technical Report PFR-1103-83-10, AD-A134119, Office of Naval Research Code 442, Arlington, VA 1983.

Siegel, J. H., Goldwyn, R. M., and Friedman, H. P., "Pattern and Process of the Evolution of Human Septic Shock," *Surgery* vol. 70, No. 2, Aug. 1971.

Primary Examiner—Gary V. Harkcom
Assistant Examiner—Phu K. Nguyen
Attorney, Agent, or Firm—Scully, Scott, Murphy & Presser

[57] ABSTRACT

A method and apparatus for processing and displaying data, and which are especially well suited to display high volumes of data at high rates, in a manner utilizing the vast human capability to perceive and recognize changes in patterns. The method comprises measuring values of a multitude of real life parameters a multitude of times, and forming a multitude of successive n-vectors from those values. Each n-vector has a plurality of components arranged in an order, and corresponding components of respective n-vectors are determined in the same manner from measured values of the real life parameters. Each n-vector is mapped onto an associated first k-vector; and each first k-vector has a plurality of components arranged in an order, and corresponding components of respective k-vectors are determined in the same manner from corresponding components of respective n-vectors. The method further comprises the steps of forming a multitude of successive images of a given type using data in the k-vectors, and displaying a multitude of the formed images.

19 Claims, 10 Drawing Sheets

| CRTARGET N.MILES | Q53 HEX | ALPQZW RADIANS | RANGE MICRONS | ZZL -- |
|---|---|---|---|---|
| 397.672 | 1AF9 | 0.01315 | 62 | 0 |
| 398.681 | 1AF9 | 0.00013 | 62 | 0 |
| 399.521 | 1AF9 | 0.01315 | 62 | 1 |
| 399.521 | --- | 0.01315 | 62 | – |
| 399.512 | --- | 0.01315 | 62 | – |
| 399.520 | --- | 0.01315 | 62 | – |
| 402.713 | 1AFB | 0.15171 | 62 | 1 |
| 405.827 | 1BFB | 0.15723 | 62 | 1 |
| 407.625 | 0BFB | 0.13117 | 65 | 0 |
| 409.713 | 0BFB | 0.13182 | 65 | 0 |
| 410.164 | 0BFF | 0.33517 | 71 | 0 |
| 412.762 | 0352 | ----- | 71 | 0 |
| 452.682 | 1517 | ----- | 71 | 0 |

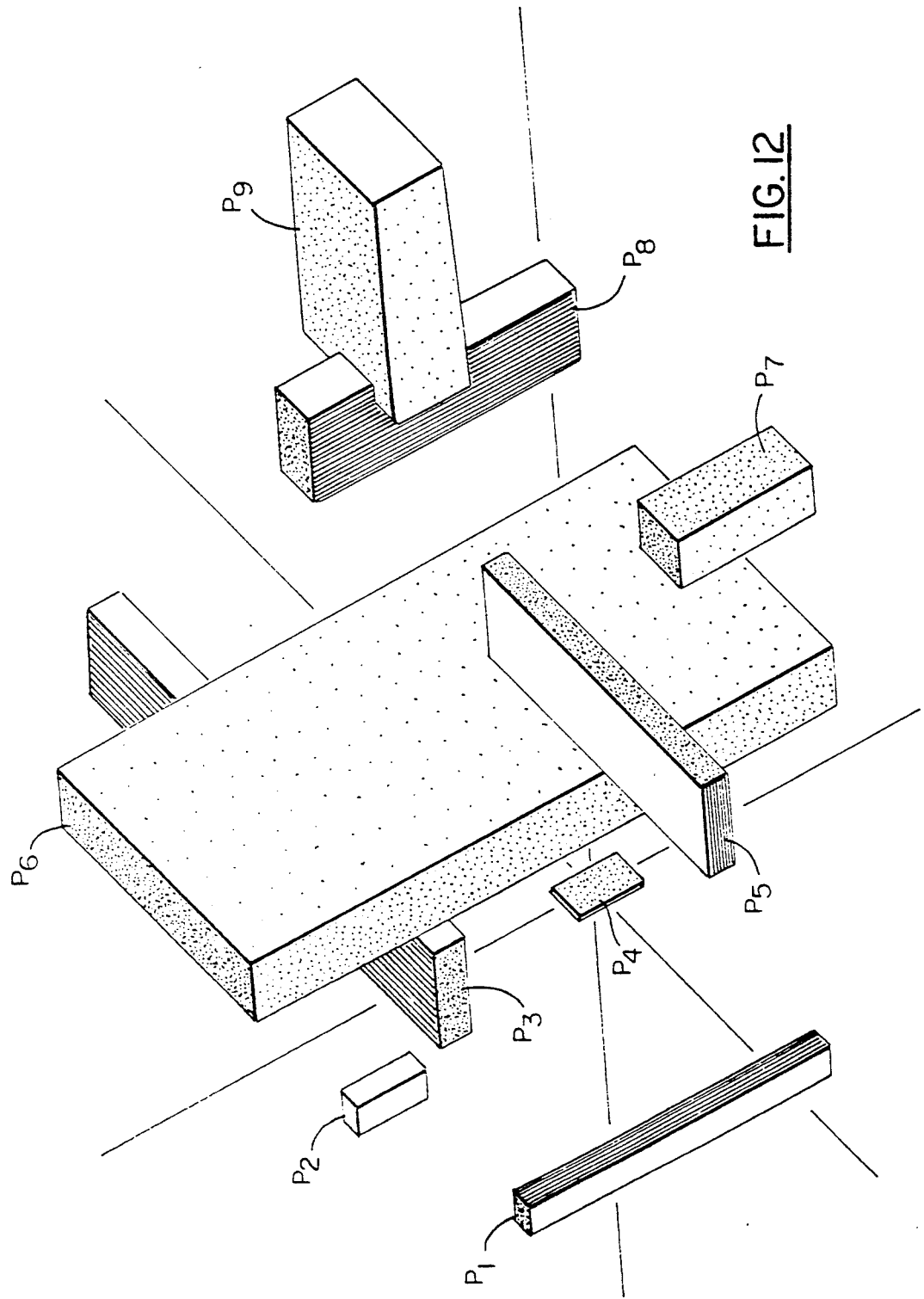

METHOD AND APPARATUS FOR PROCESSING AND DISPLAYING MULTIVARIATE TIME SERIES DATA

BACKGROUND OF THE INVENTION

The present invention generally relates to multi-dimensional graphics element displays, and more specifically, to displays of this type that are used to show multivariate time series data.

Rapid advances in electronic technology have led to a phenomena known as the information explosion. A major cause of this explosion is the increasing number of computer-aided sensing devices that gather information from the environment at astounding rates and in astounding amounts—rates and amounts too high for immediate assimilation by a human operator. Therefore, computers are often used to monitor the data that other computers are gathering in an effort to lower the total amount of information presented to an analyst or operator as a final product. With this pre-analyzed data, the analyst or operator can quickly make decisions about the environment.

Such information compression has been practiced for many years, but only recently has it received widespread recognition, often with the nomenclature of "Artificial Intelligence."

In an artificial intelligence system, a computer receives raw data and processes it using an algorithm that mimics human thought. Intuition and reasoning are reduced to programmable sets of logic and equations appropriate for the particular problem at hand, and this algorithm is then coded to operate as the raw data is acquired; that is, the data is processed in real time. When the sets of logic and equations are derived by observing the actions and reactions of a human expert (i.e., a radar expert, a meat packing expert), the artificial intelligence system is said to be an expert system. When the output of such a system is realized in a decision (i.e., yes, no, maybe), the system is said to be a decision-aid.

The premise of an artificial intelligence system is that the input data is too vast for humans to comprehend in raw form. Therefore, the input data cannot be displayed to a data analyst as is, but instead it must be pre-processed. This premise has been applied in many applications. For instance, a modern computer display of a battlefield situation gets very complicated very fast, as electronic intelligence sensors gather raw data at rates of thousands of reports per hour. The tactical decision-maker (the commander or intelligence officer) faces a complex, fast-changing display which often clouds the situation rather than clarifies it. Artificial intelligence eliminates selected information and presents only a distilled version to the commander. One consequence, of course, is that a computer algorithm now determines what is important and what is unimportant, and this is generally an undesirable situation. It would be better to have a human make such decisions, but showing all of the sensed data often produces an incomprehensible display.

The present invention challenges the basic idea that the human brain is incapable of processing high volumes of raw input data. Scientists today do not fully understand the capabilities of the human brain, but most agree that it possesses more capability than what is normally used in everyday thought. In particular, many experts believe that the human brain is much better at recognizing patterns than are even the best of contemporary computers.

For example, if an expert system is presented with unforeseen circumstances, it normally either conclude that there are no rules applicable and prompts the human user for new rules, or it adopts existing rules, which might result in a false interpretation of the tactical situation. Either course of action would cause a delay or incorrect response to a critical problem If the data is presented to the human operator in an intelligent and comprehensive way, often even highly unusual situations may be easily recognized by the human brain. Instead of concentrating on building more and more elaborate systems of rules, there must be an effort to accommodate the innate and vast human perceptual capability. The deficiency in many computer graphics presentations is not in the output volume, but in the display itself. More intelligent computer programs are not needed, but more intelligently-designed computer displays are.

Dimensionality is always the first problem met while designing any kind of graphical representation of data. If there are two parameters or dimensions, say x and y, the solution is easy. But the present invention addresses data with k parameters or dimensions, k being greater than two. For example, in an ELINT (Electronic Intelligence) sensor system monitoring a ground battlefield situation, computerized data reports may include the following dimensions: (1) the radio frequency of a detected radar signal, (2) the pulse interval of that signal, (3) the pulse duration, (4) the received signal, (5) two or three position dimensions of the signal source, (6) a velocity dimension if the signal source is moving, and (7) instantaneous performance parameters of the sensing device. To fully utilize such a piece of raw data, all of the sensed dimensions should be available for inspection simultaneously, although some of the dimensions are more important than others.

Several creative prior art approaches have been suggested for simultaneously displaying k dimensions of data. With one approach, disclosed in "Pattern and Process of the Evolution of Human Septic Shock," by Siegel, et al., *Surgery*, Volume 70, Number 2, August 1971, page 232, a circle is drawn and then points are marked along k equally space rays from the center of the circle. The distance from the circumference to each point is equal to standardized distances from the means of the k variables. The points are connected to form a polygon, and the resulting polygons assume meaningful shapes, easily recognized and grouped by the human thought processes. A more standard approach is the use of profiles. With this approach, one represents a point in k-dimensional space by a series of k bars of heights corresponding to the values of the variables, standardized in some way, and often plotted symmetrically about the mean. Yet another method disclosed in "Plots of High Dimensional Data" by D. F. Andrews, *Biometrics*, Volume 28, March 1972, page 125, uses plots of a Fourier series which produces curves suggestive of the characteristics of the data.

One of the most effective, as well as the most humorous, representation of data is by faces according to a procedure discussed in "The Uses of Faces to Represent Points in a k-Dimensional Space Graphically," by H. Chernoff, *Journal of the American Statistical Association*, Volume 68, Number 342, June 1973, page 361. With this procedure, a computer is used to draw a small cartoon face whose features, such as the length of the nose and the curvature of the mouth, correspond to the components of a data point in k-space. The human brain is so adept at processing facial data that pattern recognition is quite easy. Happy data points are quickly discerned from sad ones and sly ones. Groupings in the data form rapidly. This technique is basically the opposite of a common artificial intelligence technique. Rather than employ a computer to distinguish between human faces by some type of algorithm or arithmetical computation, Chernoff's procedure uses a computer to draw a face to help an operator analyze raw data.

Another approach to displaying multiply-dimensioned data utilizes the Lissajous patterns, first studied by J. A. Lissajous during the mid-1800s. Plotting two sine waves against each other:

$$x(t) = Ax \sin(Bxt + Cx) + Dx$$

$$y(t) = Ay \sin(Byt + Cy) + Dy,$$

t in the interval $(-E, E)$ produces an interesting pattern with information about the nine A, B, C, D, and E parameters, placing particular emphasis on the ratio of Bx to By. Additional information can be incorporated into such Lissajous patterns by parametrically varying the form of the plotted function from, for example, a sine wave to a triangular wave to a square wave. Cardioids and similar figures also have characteristic shapes which may prove useful in this problem.

The discussion above presents a very simplified approach to multiple dimensional data representations. It is limited to two dimensions. It is believed that holography will alleviate the two-dimensional constraint eventually, but color dimensions can be used in the meantime to represent dimensions greater than two. A full-color, multiple dimension display coupled with flexibility and power from a modern high resolution graphics device, provides a potentially viable method for transferring information from raw data sources to the human analyst very efficiently.

A procedure for representing multivariate time series data by means of interactive, computer-generated dynamic imagery with computer music accompaniment is disclosed in "Dynamic Representation of Multivariate Time Series Data," by Mezrich, et al., *Journal of the American Statistical Association*, Volume 79, No. 385, March 1984, Page 34. Their display depicts the data as dancing, multi-colored line segments arranged to give a sense of depth associated with the instantaneous value of the variables. The data analyst is given a data table for interacting with the system and may, among other things, scan through the data in a forward or reverse direction. Mezrich has experimentally demonstrated the superiority of such dynamic representations over traditional static ones when discerning positive, pairwise data correlations in time series.

A practical extension to the display forms discussed above is to show a three-dimensional figure in two dimensions. For instance, three-dimensional cartoon faces, and three-dimensional Lissajous patterns are obvious extensions of the above-discussed display procedures. Currently available computer systems may be used to transform a three-dimensional figure to a two-dimensional figure, such as by orthographic or perspective projections; and moreover, the two dimension figure can be easily manipulated to simulate rotation, translation and magnification or reduction of the three-dimensional figure.

Color may be used to add additional dimensions to a data display; and, for example, the intensity, hue and saturation of a color are each clearly perceived by a human and may be used to represent additional, independent dimensions. M. D. Buchanan, in "Effective Utilization of Color in Multidimensional Data Presentations," *SPIE Vol. 199 Advances in Display Technology* (1979), Page 9, reports that the standard red, green, and blue dimensions (rgb) are not easily perceived independently by a human, but intensity, hue, and saturation (ihs) are.

SUMMARY OF THE INVENTION

An object of this invention is to improve methods and systems for portraying many dimensions of raw data on a two-dimensional display screen.

Another object of the present invention is to display high volumes of data at high rates, in a manner utilizing the vast human capability to perceive and recognize changes in patterns.

A still further object of this invention is to display a multitude of images that are variations of a selected pattern and that have corresponding parameters or dimensions, and to vary the parameters or dimensions of these images to show changes in associated real life parameters.

These and other objectives are attained with a method of displaying multivariate time series data, comprising the steps of measuring values of a multitude of real life parameters a multitude of times, and forming a multitude of successive n-vectors from those values. Each n-vector has a plurality of components arranged in an order, and corresponding components of respective n-vectors are determined in the same manner from measured values of the real life parameters. Each n-vector is mapped onto an associated k-vector; and each k-vector has a plurality of components arranged in an order, and corresponding components of respective k-vectors are determined in the same manner from corresponding components of respective n-vectors.

The method further comprises the steps of forming a multitude of successive images of a given type using data in the k-vectors, and displaying a multitude of the formed images. The images of the given type have a plurality of corresponding variable image parameters; and the step of forming the images includes the steps of determining the values of the variable parameters of each formed image from the elements of a respective one of the k-vectors, and determining the values of corresponding variable parameters of the formed images from corresponding elements of the k-vectors.

Consider a two-dimensional computer simulation of a three-dimensional space having three orthogonal axes (referred to as the x, y and z axes, respectively), and displayed on a high resolution graphics monitor. At each of various points in the simulated three-dimensional space, a parallelpiped can be drawn having a length, 1x, along the x-axis, a width, 1y, along the y-axis, and a height, 1z, along the z-axis. The location of each parallelpiped can be identified by three values, x, y and z, that identify, for instance, the location of a particular corner of the parallelpiped, or of the center of the parallelpiped, in the simulated three-dimensional space. Further, suppose that each parallelpiped is given a color having a particular intensity, hue and saturation (ihs).

Using this straight-forward display, each parallelpiped has nine dimensions: x, y, z, 1x, 1y, 1z, i, h, and s. More dimensions could be added by coloring each face of the box differently, and a data analyst can extract a good deal of information from such a display. For example, for the battlefield ELINT problem mentioned earlier, the analyst might assign the display dimensions to the different raw data values of the incoming data reports as follows:

x: the frequency of the received radar signal,
y: the interval between radar pulses,
z: the duration of the radar pulses,
1x: the velocity of the source of the radar pulses along a first axis aligned with the direction of primary tactical motion,
1y: the velocity of the source of the radar pulses along a second axis, perpendicular to the first,
1z: a relative threat value assigned to the radar source,
i: the age of the data report,
h: the distance of the radar source from a given location,
s: the intensity of the radar signal.

In accordance with the present invention, as each ELINT data report is received by the data-processing system, a colored box may be formed on a display screen. Of course, an analyst might find another pattern more suitable to the tactical situation, so he is given the ability to change the display quickly and easily.

The data-processing system of this invention transmits raw information to a data analyst, who, upon his comprehension, transmits a distilled version to the tactical decision maker. An important feature of the invention is that real, human intelligence, not artificial intelligence, is used throughout the process. The human analyst who is working with the system of the present invention should be familiar with the environment that the data represents. A meat packer analyzing battlefield data is just as inappropriate as a military intelligence officer analyzing meat-packing data. The present invention works for both types of data, but the human analyst must be capable of understanding the data he is presented.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 7 shows how preprocessed data may be moved into k-vector space.

FIG. 12 shows an alternate display that may be produced by the present invention.

DETAILED DESCRIPTION OF THE PREFERRED EMBODIMENTS

Figure 1:
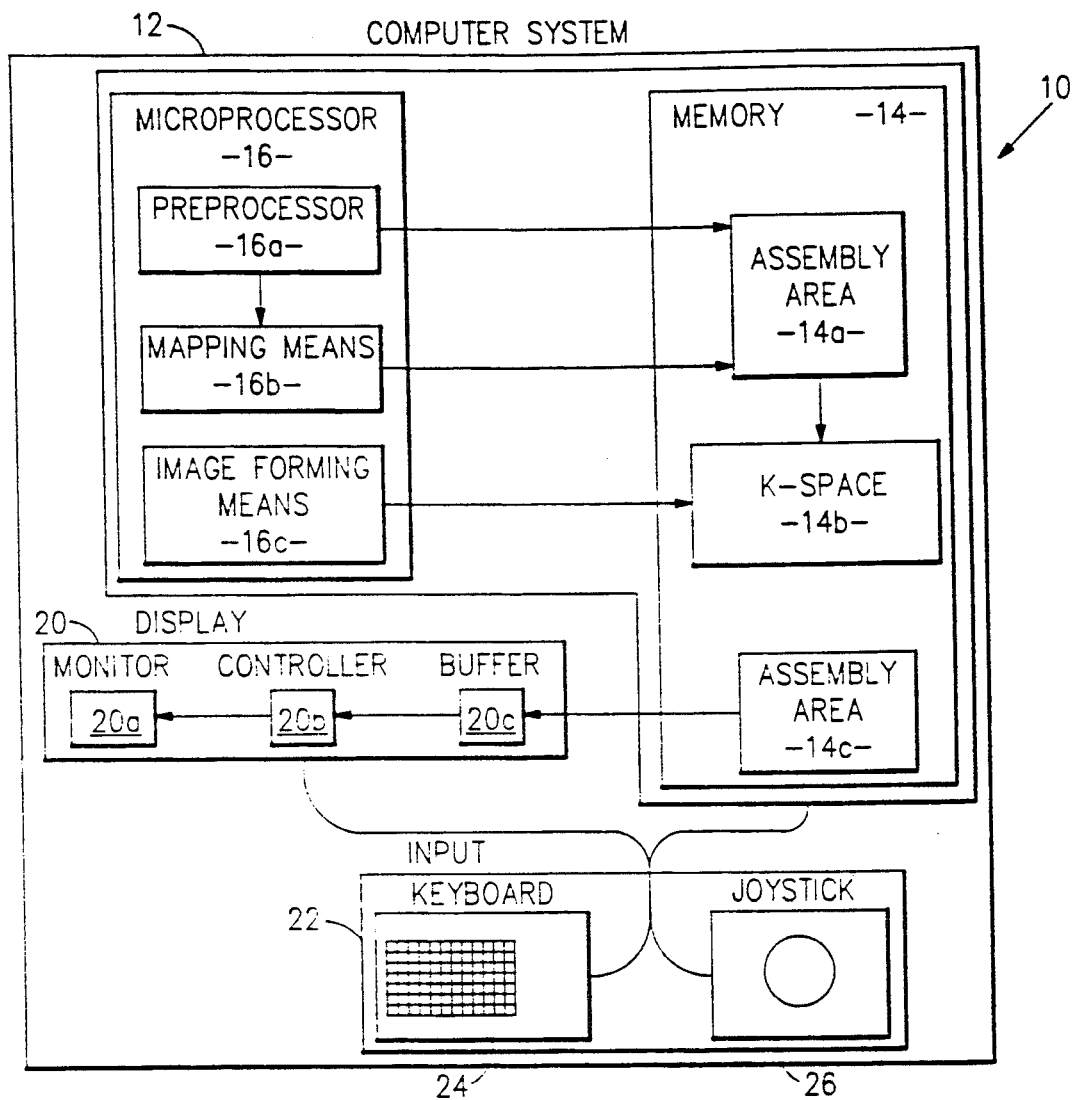
FIG. 1 is a simplified block diagram of a data processing and display system that may be used to practice the present invention.

FIG. 1 generally outlines data processing and display system 10 that may be employed in the practice of the present invention and which preferably comprises a conventional computer system 12 including a random access memory 14 and a microprocessor 16, programmed as described below in detail, to process signals and data conducted to the computer system and to generate output data that is conducted to display means 20 to display various images. When programmed as described below, processor 16 can be considered as including preprocessor 16a, mapping means 16b and image forming means 16c. Preprocessor 16a preprocesses the raw data conducted to the computer and forms that data into successive n-vectors, which are assembled in area 14a of memory 14. Mapping means 16b maps each n-vector into one or more k-vectors, which are assembled and stored in memory area 14b, referred to as k-space. Display forming means 16c uses data in these k-vectors to form display data sets in an assembly area 14c of the processor memory.

Display means 20 includes a monitor 20a and a monitor controller 20b, and preferably the display means further includes buffer or holding area 20c. The display data assembled in memory area 14c is transmitted to controller 20b, where that data is used to control monitor 20a to show the desired display. Selected data may be held in buffer area 20c to control the rate of changes to the display shown on monitor 20a. Input means 22 are provided to allow an operator or analyst to interact with memory 14, processor 16, and monitor 20; and preferably the input means includes a conventional keyboard 24 and joystick 26 or other continuous analog positioning interface, such as a mouse or trackball.

Preferably, computer system 10 is a high speed digital computer, and monitor 20a is a color monitor. Further, it is preferred that monitor 20a be capable of displaying alphanumeric and high resolution graphics simultaneously, or alternately, a separate display means or monitor may be provided to present alphanumerics. Computer system 12 may be provided with additional devices (not shown) such as one or more disk or tape drives for receiving computer programs and data to be executed and processed by the processor, and a printer may be provided to produce a permanent record or listing of data transmitted to, processed in, or generated by the computer system.

Figure 2:
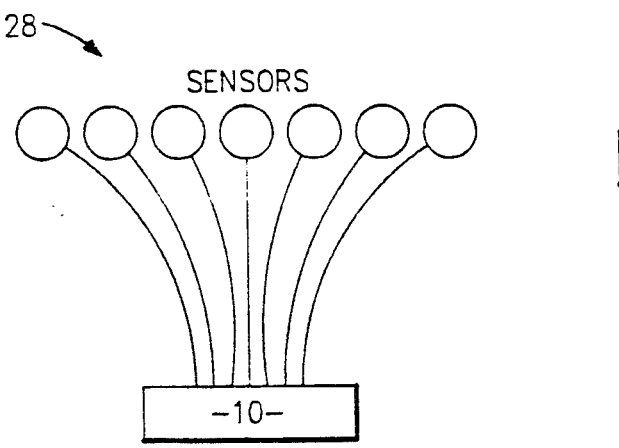
FIG. 2 illustrates one arrangement for transmitting input data to the system shown in FIG. 1.
Figure 3:
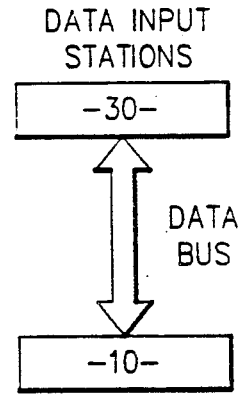
FIG. 3 illustrates an alternate arrangement for transmitting input data to the data processing and display system of FIG. 1.

The raw data processed by system 10 may be transmitted thereto in any suitable manner, and preferably the computer system is capable of accepting the raw data in various forms and formats. For example, with reference to FIG. 2, a multitude of sensors 28 may be used to acquire the raw data and to generate the appropriate signals that are conducted to computer system 12. Any suitable types of sensors may be used in the present invention, and many acceptable techniques for gathering data in a form suitable for use in the present invention are very well known. Alternatively, with reference to FIG. 3, the raw data values may be transmitted to computer system 10 over a data bus from one or more data input stations 30.

As will be understood by those of ordinary skill in the art, the data generated by display data forming means 16c of processor 16 may itself be processed in any suitable way to produce the desired pattern on monitor 20a. Typically, the basic display device for computer generated raster graphics is the CRT monitor, which is closely related to the standard television receiver. In order for the full potential of raster graphics to be achieved, such displays require support systems which include large-scale, random-access memories and digital computational capabilities. Typically, each pixel in a rectangular array of the picture elements of a CRT is assigned a unique address, comprising the x and y coordinates of each pixel in the array. Information to control the display is stored in a random-access frame memory (RAM) at locations having addresses corresponding to those assigned to the pixels. The source of pixel control data stored in the RAM is typically a microcomputer located in a graphics controller which will write into the addressable memory locations the necessary information to determine the type of display.

This frequently is an address in a color look-up memory, at which location there is stored the necessary binary color control signals to control the intensity of the color of each pixel of an array. The horizontal and vertical sweep of the raster scan is digitized to produce the addresses of the pixels, which addresses are applied to the frame memory in which the controller has previously written the information determinative of the display. This information can also be an address in a color look-up memory. The data is read out of the addressed location in the color look-up memory and the necessary color control signals are obtained. The color signals are converted to analog signals and applied to the three color guns of the typical CRT to control the intensity and color of each pixel as it is scanned.

Figures 4, 11:
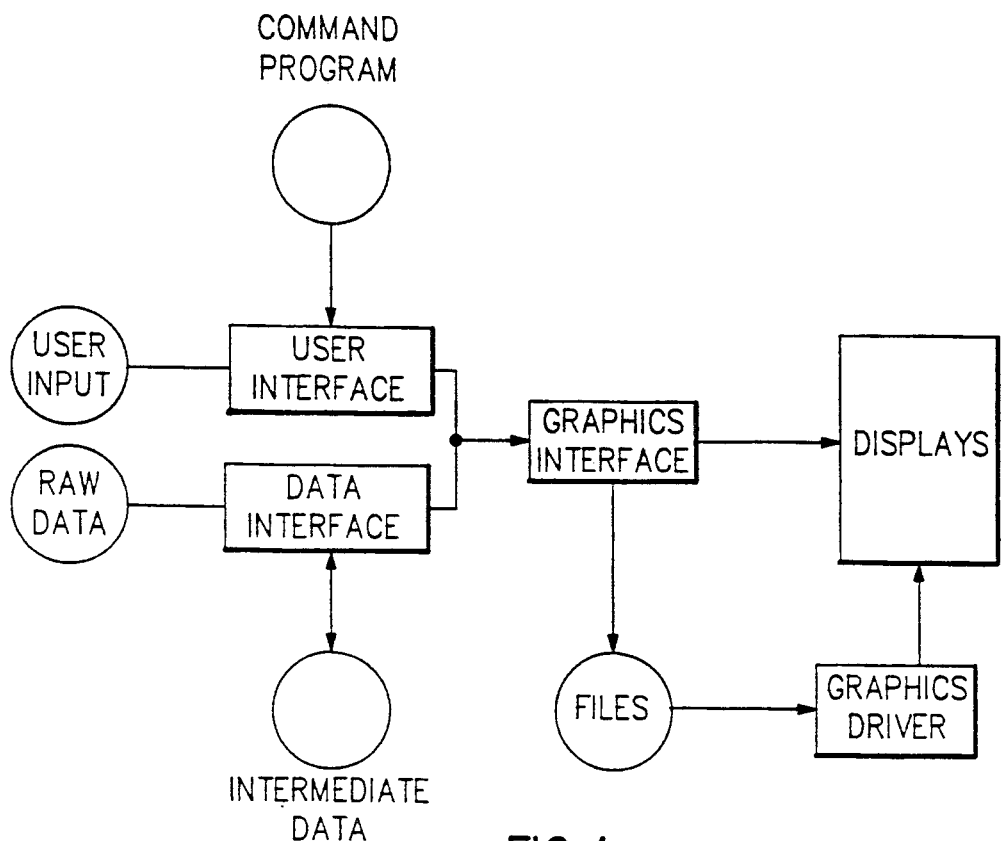
FIG. 4 identifies the major functional components of the system of FIG. 1.
FIG. 11 shows one display that may be produced by the present invention, and in particular, is a tabular display of raw data.

With reference to FIG. 4, the operation of system 10 can be considered as being comprised of four major functions: user interface functions, data interface functions, graphics interface functions and display functions. The user interface functions process input data from the user and any input command programs. These input data may be used, for example, to transform or process the raw data values, to select certain data vectors or data files for further processing, to plot display parameters and to control various other specific functions of system 10.

The data interface functions, generally, process the raw data values transmitted to system 10; and for example, these functions may provide system 10 with the capability of reading a high-density digital recording tape containing bus messages. Preferably, the data interface functions also provide system 10 with the capability of transmitting intermediate data, such as the n-vectors and the k-vectors, to and receiving such intermediate data from a peripheral device. The data interface functions preferably also enable system 10 to process internal files and subfiles according to any suitable procedures.

The graphics interface functions assemble the necessary monitor control data needed to show the desired display. For example, the graphics interface functions may use standard basic, or low-level graphics programs or routines to form object programs, and then use these basic programs and the formed object programs to produce the desired displays. Preferably, the monitor control data assembled by the graphics interface functions may be used directly to control the display monitor of system 10 or this data may be transmitted to a separate file, which can later be used to control the display monitor of system 10 or another display monitor via a graphics driver.

The display control functions control the actual display shown on monitor 20a. These display controls are formed from the above-discussed low level graphics programs and the objects programs formed therefrom. For instance, as discussed below, the display control functions may be provided to represent data in the form of points on a conventional x-y graph, in the form of rectangles, or in the form of colored parallelpipeds.

Figure 5:
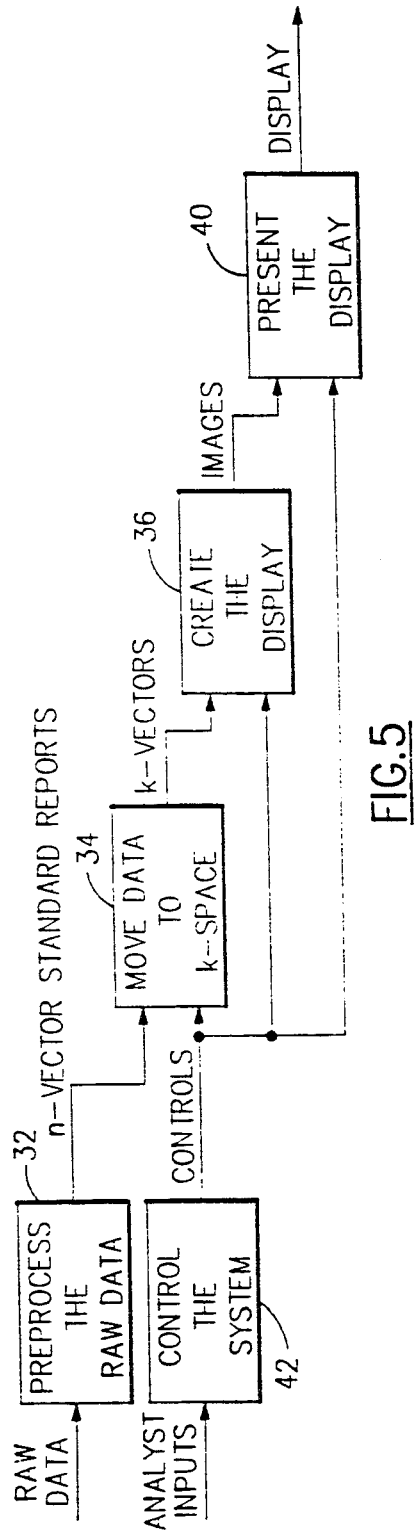
FIG. 5 generally, outlines the operation of the data processing and display method of this invention.

Generally, with reference to FIG. 5, the system of this invention performs the following procedures:

(1) the raw data is preprocessed,
(2) the preprocessed data are then mapped into k-vectors,
(3) the data needed to create the displays are formed from the k-vectors, and
(4) these displays, or selected displays, are presented.

These procedures are represented in FIG. 5 by boxes 32, 34, 36 and 40, respectively. The system of the present invention also permits an analyst or operator to control numerous aspects of the above-outlined procedures, as represented by box 42 in FIG. 5. The sections which follow describe in detail each of the above-identified procedures.

PREPROCESSING THE RAW DATA

Figure 6:
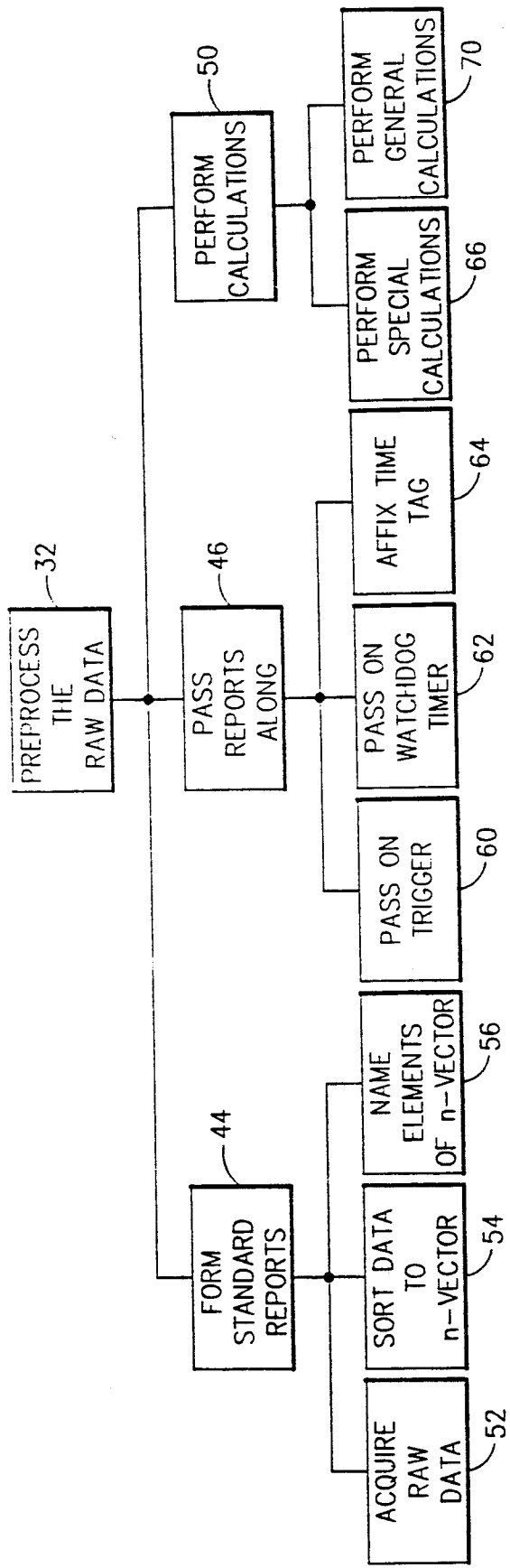
FIG. 6 is a table identifying various steps of the data preprocessing component of the method outlined in FIG. 5.

With reference to FIG. 6, the acquired raw data is preprocessed, generally, by forming that raw data into standard reports, performing selected calculations using the acquired raw data, and then passing the formed reports on to k-space. These steps are represented in FIG. 6 by blocks 44, 46 and 50, respectively. More specifically, as represented by box 52 in FIG. 6, the system of the present invention receives a time series of raw data for a number of different parameters or dimensions. The methods by which such data may be acquired are many and varied, and the purpose of the preprocessing function is to standardize the received data into a form known as a "report". In particular, as represented by box 54 in FIG. 6, preprocessing algorithms are used to distribute the acquired raw data into n-element vectors, where n may vary from vector to vector. Specific data variables (that is, data variables representing specific real life parameters) occupy specific locations in the n-vectors; and, as represented by box 56 in FIG. 6, each vector location preferably has an alphanumeric name associated with it. The names are used to refer to the data dimensions throughout the system.

Generally, the n-vector is held in a large section of computer memory. It represents all the possible data dimensions. For a typical application, n might be 50, 100, 200, or more, with k (which is the number of the dimensions or parameters of the figure ultimately displayed) being 15 or less. Beside the data acquisition and distribution function described above, the preprocessor provides a timing function as well; and, in particular, the preprocessor decides when to pass a report or n-vector onto the k-space. For example, with one technique, raw data is acquired and then parcelled into an n data vector in a manner analogous to the way a postal clerk sorts letters into a wall of mailboxes. Data values are placed into the data vector according to identification tags in the data (which correspond to addresses on the letter). The question is, however, at what point should the data vector be passed along through the system for further processing?

Unlike a postal mailbox, a data vector element in computer memory holds only one data value at a time, so a logical point to pass the data vector is whenever an element of the vector is about to be overwritten. In most cases, however, the data analyst is not concerned with every change in every dimension, but is particularly concerned with changes in certain dimensions. The important dimensions are identified as "trigger" dimensions; and, as represented by box 60 in FIG. 6, an entire data vector may be passed to k space whenever a value for a trigger dimension is about to be overwritten in the vector. Alternatively, a vector may be passed on to k-space when selected combinations of vector elements are overwritten, or when a group of selected vector elements are overwritten in a particular sequence. For example, a vector may be passed when the value at location 7 of the vector is overwritten, or when the values at locations 22 and 12 of the vector are overwritten. When a vector is passed to k-space, the latest value stored at each element or location of the vector is passed onto k-space.

Further, in order to handle the case when no trigger dimensions are specified, or when no value for a trigger dimension is overwritten, a timer, referred to as a watchdog timer, may be provided to pass along data reports at fixed time intervals, as represented by box 62 in FIG. 6.

As represented by box 64 of FIG. 6, when a data vector is about to be passed to k-space, a time value is placed in the data vector by the preprocessor to indicate the age of the report—that is, the length of time over which the data in the vector has been collected. The time value is a data value generated by the preprocessor and is handled like all the other data values. The time value preferably is continuous in form, such as elapsed seconds, and not discontinuous in form, such as hours, minutes, and seconds.

As mentioned above, the preprocessor may be employed to perform various calculations; and, in particular, the preprocessor performs two types of calculations, referred to as special and general calculations, represented respectively by boxes 66 and 70 in FIG. 6. Special calculations are those that derive a value for a parameter from raw data values for other parameters, while general calculations are those that simply modify or adjust the value for a particular parameter. For example, often, the acquired raw data do not contain all the parameters of interest to the data analyst, but do contain the values necessary to compute these parameters. For example, the raw data may include the speeds of an aircraft in the north and east directions, but not the velocity of the aircraft. The preprocessor may compute the latter value from the former values, however. Such calculations are termed special calculations and are distinct from general calculations because they are inextricably tied to the raw data stream.

General calculations may also be performed and include the following:
(1) adding one vector element to another, or subtracting one vector element from another,
(2) adding a constant to a vector element,
(3) multiplying a vector element by a constant,
(4) multiplying a vector element by itself to derive the square of the vector element, and
(5) deriving the square root of a vector element.

For instance, the value to be placed in the 17th location of a vector could be defined as the sum of the values in the 23rd and 19th locations of the vector.

As described above, system 10 forms the n vectors from the raw data transmitted to the computer system. It should be noted that the present invention may also employ pre-formed n vectors that are transmitted to computer system 10 from a peripheral device. For instance, these pre-formed n-vectors may be formed and stored in a separate computer system and then transmitted to system 10 when an analyst wants to produce displays representing the data in the n-vectors. Moreover, memory section 14a may include a multitude of files, with the n vectors stored in these files according to any suitable order. For example, the n-vectors may be filed according to their ages, or according to the value of a selected one or more of the elements of the n-vectors.

MOVING THE DATA INTO K-SPACE

A basic concept of the system of this invention is to present multiply-dimensioned time series data to an analyst. However, even with clever schemes such as cartoon faces, multi-colored parallelpipeds, and three-dimensional patterns, the number of data dimensions on an intelligible computer graphics display is limited by some relatively small number, k, at any given time. Typically, k ranges from 2 to 20 for practical displays. The number of dimensions in the raw data, however, often exceed this. Therefore, the system of this invention is able to map each n-vector having n values into one or more k-vectors having k values. This section describes this mapping, and the various steps or subroutines of this mapping function are shown in FIG. 7.

Figure 7:
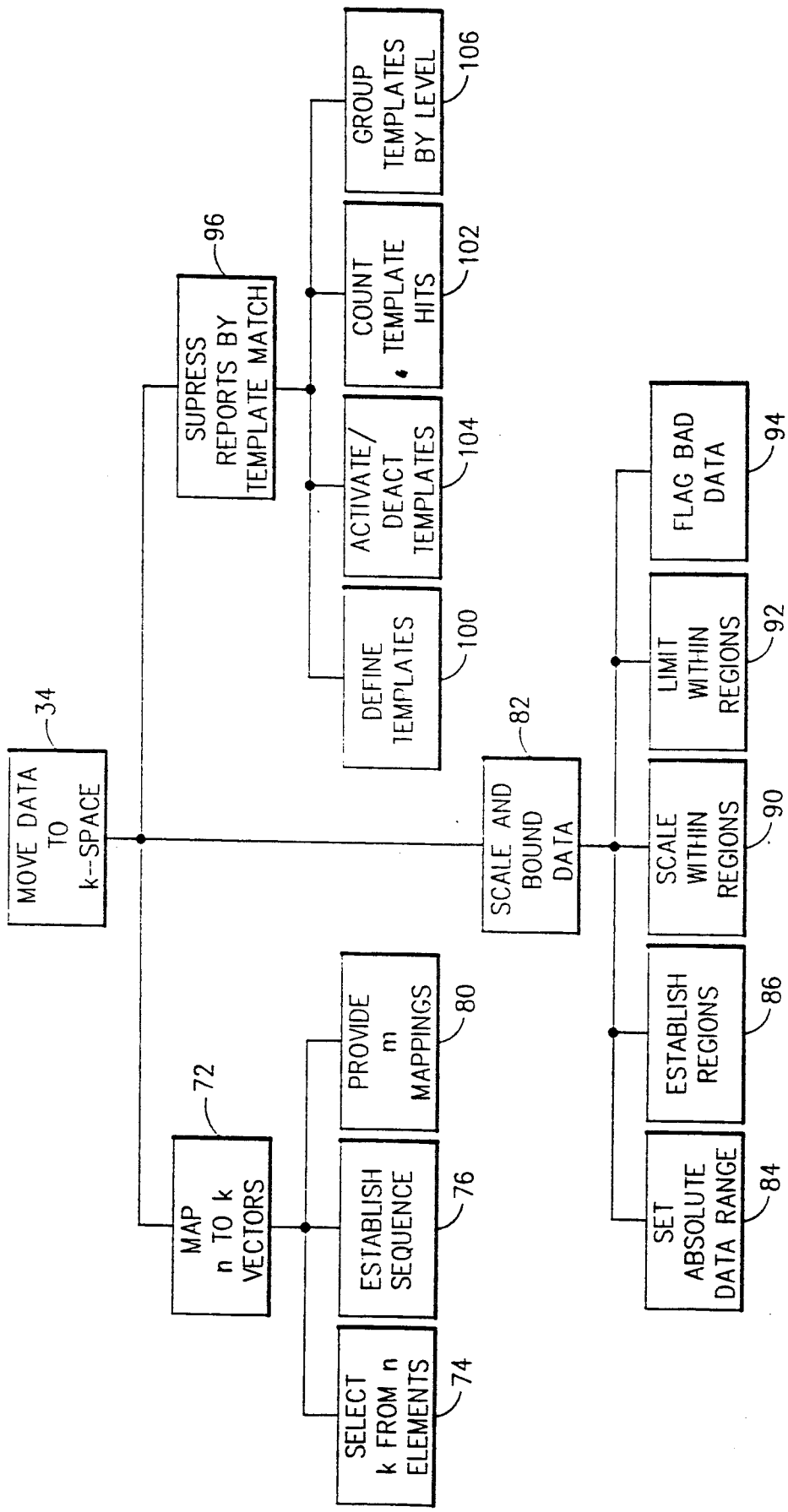
FIG. 7 is a second table identifying various steps of a second major component of the method shown in FIG. 5, and in particular.

Normal mapping is straightforward and is represented by box 72 in FIG. 7. A total of k elements are selected by the analyst from the n-vector, as represented by box 74 of FIG. 7, and these elements are passed to the k-space for subsequent processing. If n is greater than k, the values in the n-vector that are not passed into the k-vector are discarded. When n and k are equal, the mapping function preferably also enables the analyst to change the order of the components as the k-vector is formed, as represented by box 76 in FIG. 7. For instance, the values in the first, second and third locations in the n-vector may be placed, respectively, in the second, third and first locations of the k-vector. For the case of n less than k, the unused locations in the k-vector are filled with a default value.

With the preferred system of the present invention, a group of m k-vectors (where m is a whole number) may be mapped from each n-vector, as represented by block 80 of FIG. 7. The k-vectors formed from a particular n-vector are represented by the symbol $k_i$ where $i = 1, 2, \ldots, m$. The number of k-vectors in each group (that is, the number of k-vectors that are formed from each n-vector) may vary from n-vector to n-vector; and, also, the k-vectors formed from a particular n-vector may have various number of elements.

Figure 8:
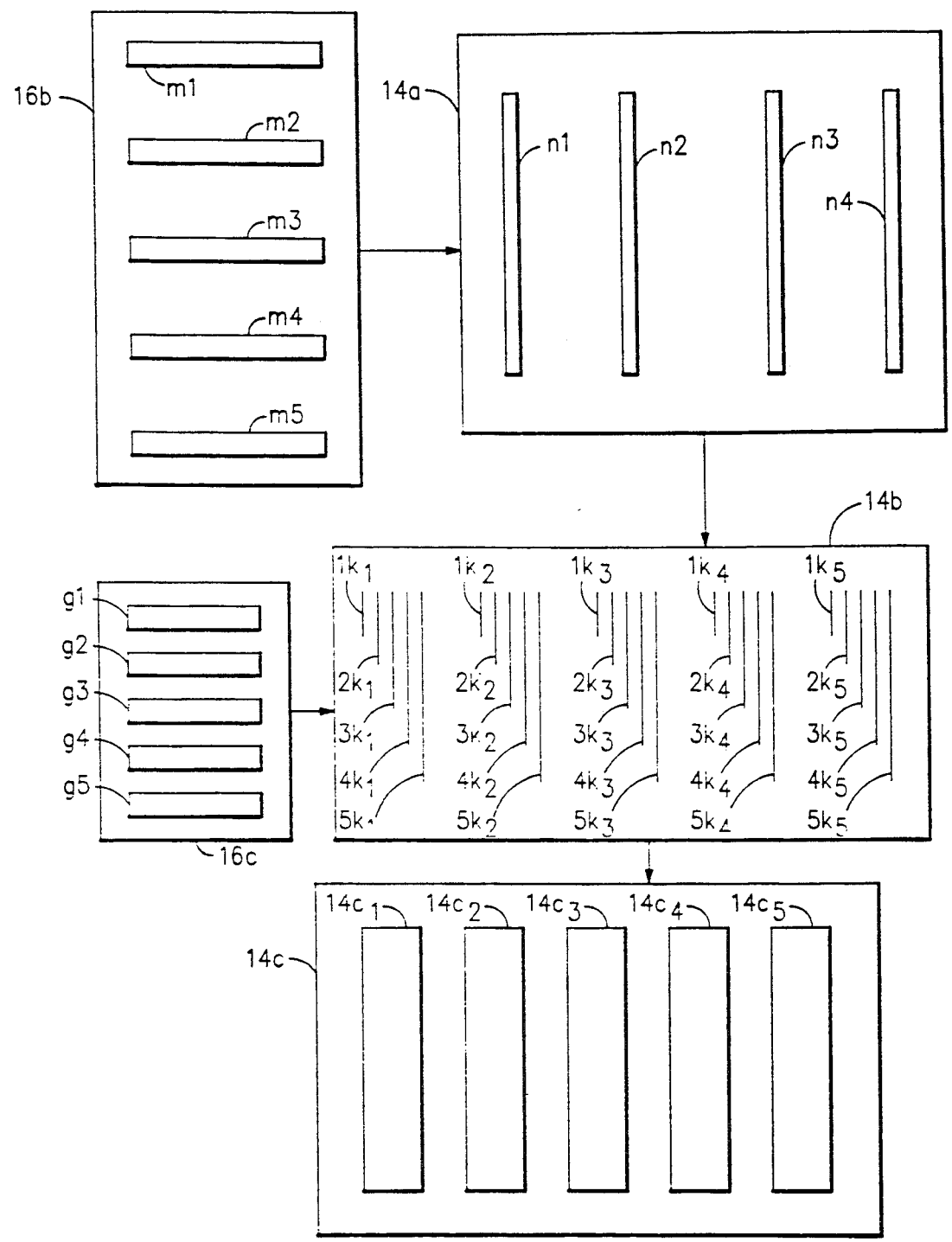
FIG. 8 is a more detailed diagram of various components shown in FIG. 1.

For example, FIG. 8 schematically shows four n-vectors, n1, n2, n3 and n4, and schematically shows five mapping modules m1, m2, m3, m4 and m5, each of which may be used to map each n-vector onto an associated k-vector. Thus, mapping module m1 maps the vectors n1, n2, n3 and n4 onto the vectors $1k_1$, $2k_1$, $3k_1$ and $4k_1$ respectively; module m2 maps the vectors n1, n2, n3 and n4 onto the vectors $1k_2$, $2k_2$, $3k_2$ and $4k_2$ respectively; module m3 maps the vectors n1, n2, n3 and n4 onto the vectors $1k_3$, $2k_3$, $3k_3$ and $4k_3$ respectively. Similarly, module m4 maps the vectors n1, n2, n3 and n4 onto the vectors $1k_4$, $2k_4$, $3k_4$ and $4k_4$ respectively; and module m5 maps the vectors n1, n2, n3 and n4 onto the vectors $1k_5$, $2k_5$, $3k_5$ and $4k_5$ respectively.

All of the k-vectors formed by the same mapping module have the same number of elements. Thus, vectors $1k_1$, $1k_2$ and $1k_3$ have the same number of elements; vectors $2k_1$, $2k_2$ and $2k_3$ have the same number of elements; and vectors $3k_1$, $3k_2$ and $3k_3$ have the same number of elements. Typically, but not necessarily, the number of elements in the k-vectors formed by each mapping module is different than the number of elements in the k-vectors formed by each of the other mapping modules. Hence, for instance, the number of elements in the k vectors formed by mapping module m1 is different than the number of elements in the k-vectors formed by mapping module m2, and both of these numbers are different than the number of elements in the k vectors formed by mapping module m3.

All of the k-vectors that are formed in the same way from the n-vectors form a set of corresponding k vectors. Thus, for instance, the 1k-vectors (that is the $1k_1$, $1K_2$, $1K_3$, $1k_4$ and $1K_5$ vectors) form a first set of corresponding k-vectors, the 2k-vectors (that is, the $2K_1$, $2K_2$, $2K_3$, $2K_4$ and $2K_5$ vectors) form a second set of corresponding k-vectors, and the 3k-vectors $3K_1$, $3K_2$, $3K_3$, $3K_4$ and $3K_5$ vectors) form a third set of corresponding k-vectors. Likewise, the 4K-vectors (that is, $4K_1$, $4K_2$, $4K_3$, $4K_4$ and $4K_5$ vectors) form a fourth set of corresponding k-vectors, and the 5k-vectors (that is, the $5K_1$, $5K_2$, $5K_3$, $5K_4$ and $5K_5$ vectors) form a fifth set of corresponding k vectors.

The analyst specifies each mapping module in any suitable manner, either before or while the raw data is processed, and mapping modules may be added, deleted or modified under the control of the analyst or operator. Moreover, it is not necessary to map each n vector into the same number of k-vectors; and, for instance, each of a first group of n-vectors may be mapped into three k-vectors, while each of a second group of n vectors may be mapped into four k-vectors.

In addition to mapping, the formation of a display requires that the data in each k-vector be properly scaled and bounded, and this procedure is represented by block 82 in FIG. 7. The first step in this procedure is to establish the absolute minimum and maximum values that each data parameter may take, as represented by block 84 in FIG. 4. These absolute bounds are specified by the analyst for each data parameter, or element, in the k-vector and are usually based on the physical limitations of the data acquisition system.

The next step in the scaling and bounding procedure, represented by box 86 in FIG. 7, is to establish one or more data regions for each element in the k-vector. In particular, for each element of the k-vector, the range between the absolute minimum and maximum values for the element is separated into one or more regions. The established region or regions for an element span the entire range between the absolute minimum and maximum values for that element; and if plural regions are established, they do not overlap. For instance, if the element of a k-vector is the effective range of a radar system, the minimum and maximum values for that element may be 0 and 200 miles; and this range may be separated into two regions: 0 to 1 mile, and 1 mile to 200 miles.

With the regions established, the analyst then assigns one of three values to each region:
(1) a scale factor,
(2) a constant value, or
(3) a bad data flag.
The steps of assigning these values to the data regions are represented, respectively, by boxes 90, 92 and 94 of FIG. 7.

Whenever a raw data value is about to be placed into a k-vector, the region in which the raw data value lies is determined. If a scale factor has been assigned to this region, the raw data value is multiplied by that scale factor, and the product is placed in the k-vector. For example, the scale factor may be one, one-half or two. If a constant value has been assigned to the region in which the raw data value lies, that constant value is placed in the k-vector and the raw data value itself is discarded. Finally, if the bad data flag has been assigned to the region in which the raw data value lies, a special flag value is placed in the k-vector and the raw data value discarded. The system user has control over the scaling and bounding of the elements of the k-vectors, both before, and while the k-vector data is processed.

Figure 9:
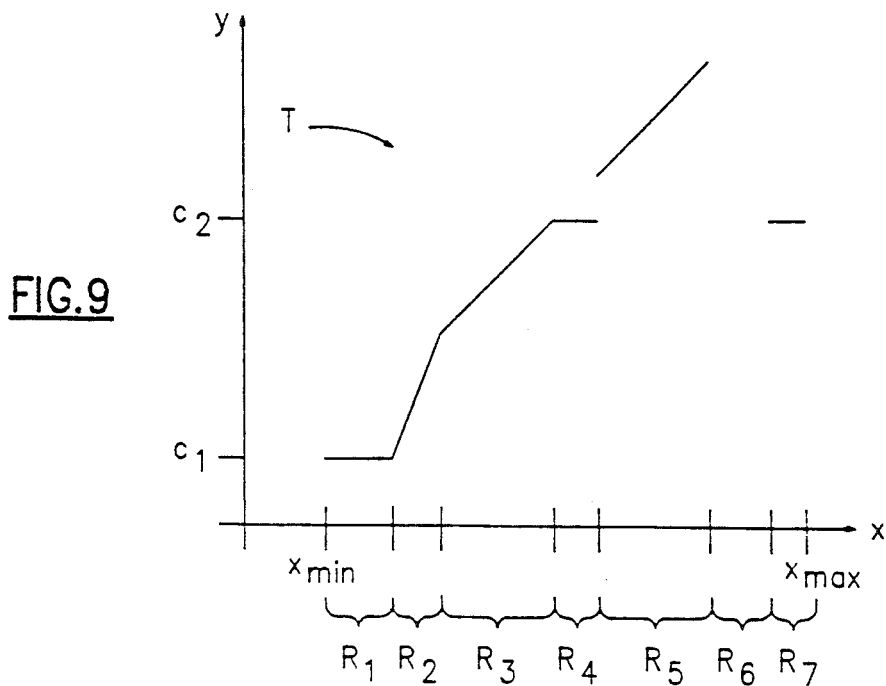
FIG. 9 shows a transfer function that may be used to determine a component for a k-vector from a measured value of a real life parameter.

FIG. 9 schematically illustrates the scaling and bounding of a raw data value for a particular parameter or dimension; and specifically, the figure shows a transfer function T to determine the value that is placed in the k-vector for given raw data values between the absolute minimum and maximum values. For this particular parameter, the minimum acceptable raw data value is $x_{min}$, the maximum raw data value is $x_{max}$, and the range between these minimum and maximum acceptable values is divided into seven regions, $R_1$ through $R_7$. Generally, the location of a raw data value is found in the x-axis and, except for the bad data region $R_6$, the y-value of the transfer function T at that point along the x-axis is the value that is placed in the k-vector.

Thus, if the raw data value is in region $R_1$, a constant value $c_1$ is placed in the k-vector; and if the raw data value is in regions $R_4$ or $R_7$, a constant value $c_2$ is placed in the k-vector. If the raw data value is in region $R_2$, the value, y, that is placed in the k-vector is determined by the equation: $y = y_0 + bx$, where $y_0$ is the y intercept of the segment of transfer function T in region $R_2$, and b is the slope of this line segment. If the raw data value is in regions $R_3$ or $R_5$, the raw data value itself is placed in the k-vector; and if the raw data value is in region $R_6$, a bad data flag is placed in the k-vector.

With reference again to FIG. 7, a third step performed as the k-vectors are formed is to remove selected data from the processing system by means of a procedure referred to as template suppression and represented by block 96 of FIG. 7. In this procedure, the analyst defines or forms what is referred to as a vector template, by specifying a data range for each element of the k-vector; and a multitude of such vector templates may be formed, as represented by block 100 of FIG. 7. The k-vectors are compared to the vector templates; and when all of the data values of a particular k-vector fall within the respective specified data ranges of a vector template, the k-vector is said to fit the template, a situation referred to as a "hit."

Normally, when a k-vector fits a vector template, the entire vector is discarded; however, selected such k-vectors may be kept for further processing. For example, a count may be kept of the number of k-vectors that fit a given template, as represented by block 102 of FIG. 7, and every jth k-vector that fits the template (where j is a whole number specified by the analyst) may be kept for further processing.

Various templates may be defined by the analyst, but declared deactive until later activated, as represented by block 104 of FIG. 7. In particular, when a template is declared deactive, the formed k-vectors are not compared to the specified data ranges of the deactivated templates. A multitude of templates may be formed and arranged in a plurality of groups, as represented by block 106 of FIG. 7, and the analyst can activate or deactivate different groups of templates to control the complexity of the display.

FORMING THE DISPLAYS

The result of the above-discussed preprocessing and moving steps, represented by blocks 32 and 34 in the figures, is a series of sets of k-vectors that are stored in k-space in memory 16. This section discusses the development or creation of the displays generated by system 10 to show the data in the k-vectors, and FIG. 10 shows various steps used to develop or create the displays.

Figure 10:
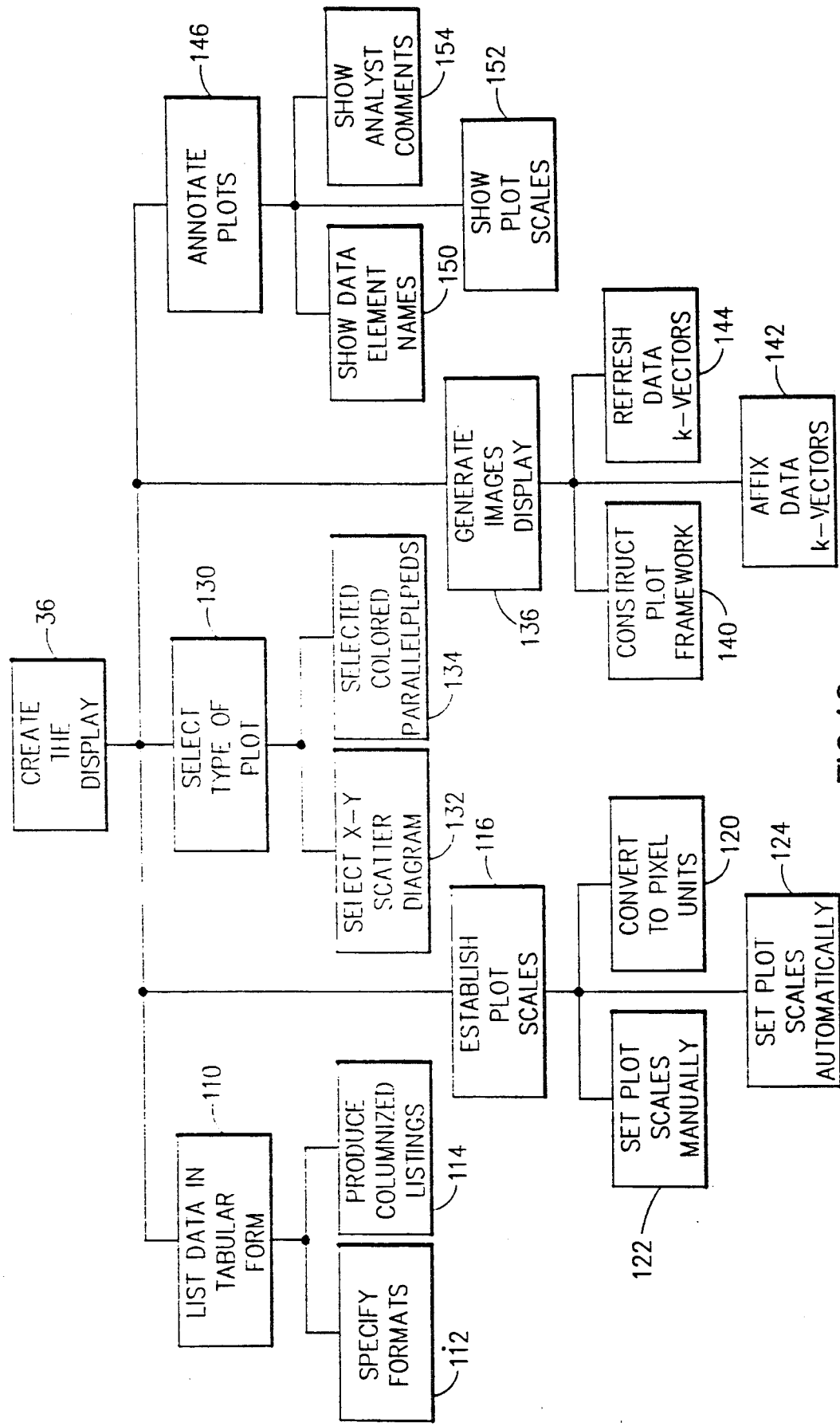
FIG. 10 is another table identifying parts of a fourth major component of the method outlined in FIG. 5, and more specifically, depicting how an image or pattern is developed.

Preferably, as represented by block 110 of FIG. 10, system 10 is able to produce a simple tabular listing of the data in either the n or k-vectors, for example, as shown in FIG. 11. Such a listing is very helpful in detecting, diagnosing and correcting any system faults or errors, in either hardware or software, and is often quite valuable during actual system operation. The format of the listing, such as the number of places before and after each decimal point and the column headings, is selected by the analyst for each vector element, as represented by block 112 of FIG. 10. Preferably, the list is in columnar form, as represented by block 114 of FIG. 10.

Data processing system 10 also produces graphical displays showing or representing the data in the k-vectors; and preferably, system 10 is able to produce a multitude of different types of displays, each of which includes a multitude of images. With this preferred arrangement, different types of displays are used to represent different sets of k-vectors, and each image of a given type of display represents the elements of a respective one k-vector of the set of k-vectors represented by that given type of display. Further, each image of a particular display type has a given number of variable image parameters, and this number is equal to the number of elements in each k-vector in the set of k-vectors represented by that particular display type, so that there is a one-to-one correspondence between the elements of a particular k-vector and the variable image parameters of any image used to represent that k-vector.

For example, a first type of display may comprise points on a conventional x-y grid, a second type of display might be a multitude of circles on an x-y grid, a third type of display may comprise a multitude of rectangles, a fourth type of display might be a multitude of parallelpipeds, and, as represented in FIG. 12, a fifth type of display may include a multitude of colored parallelpipeds $p_1-p_9$. With the first display type, each point may represent a respective one k-vector having two elements that are used, respectively, to determine the x and y coordinates of the point on the display; and with the second display type, each circle may represent a respective one k-vector having three elements, with the first two elements used to determine the x and y coordinates, respectively, of the center of the circle, and with the third element of the k-vector being used to determine the radius of the circle. In the third type of display, each rectangle may represent a respective one k-vector having four elements, with the first two elements of the vector determining the position of a particular corner of the rectangle, and the third and fourth elements of the vector determining the length and height of the rectangle, respectively.

With the fourth type of display, each parallelpiped may represent a respective one k-vector having five elements, with the first two elements of the vector used to determine the x and y coordinates of a particular corner of the parallelpiped, and the last three elements of the vector used, respectively, to determine the height, width and depth of the parallelpiped. With the fifth type of display, each parallelpiped may represent a respective one k vector having eight elements, with the first two elements of the vector used to determine the x and y coordinates of a particular corner of the parallelpiped, the next three elements of the vector used, respectively, to determine the height, width and depth of the parallelpiped, and each of the last three elements of the vector used to determine the color of a respective one side of the parallelpiped.

A respective one graphics module is preferably provided to form each type of display; and, for instance, with reference again to FIG. 8, system 10 may be provided with graphics module g1-g5 to form the five above-described display types. In particular, graphics module g1 may be used to form a display of points on an x-y grid from the elements of the 1k-vectors, with each point of the display representing a respective one 1k-vector; and graphics module g2 may be used to form a display comprising a multitude of circles from the elements of the 2k-vectors, with each circle representing a respective one 2k-vector. Module g3 may be used to form a display comprising a multitude of rectangles from the elements of the 3k-vectors, with each rectangle representing a respective one 3k-vector. Module g4 may be used to form a display including a multitude of parallel pipeds from the elements of the 4k-vectors, with each of these parallelpipeds representing a respective one 4k-vector; and graphics module g5 may be used to form from the elements of the 5k-vectors a display comprising a multitude of colored parallelpipeds, with each colored parallelpiped representing a respective one 5k-vector.

Any suitable graphics modules may be employed in the practice of the present invention to generate the desired displays, and many such graphics modules may be readily constructed by those of ordinary skill in the art.

As described above, each type of display is used to represent a respective one set of k-vectors. While this is the normally preferred procedure, it is not necessary to the practice of the present invention in its broadest sense, and the same type of display may be used to represent different sets of k-vectors. For instance, over a first period of time, the first of the above-described display types may be used to represent the 1k-vectors; and over another period of time, this same display type may be used to represent a sixth set of k vectors, each of which also has two elements. Also, system 10 may be provided with a plurality of graphics modules that produce the same type of display at the same time from different sets of k vectors.

To develop a graphical display, the scale of the graph is determined, as represented by block 116 of FIG. 10. To do this, the analyst selects minimum and maximum display values for each of the k dimensions in the display. This function is separate from the data scaling and bounding function described in the previous section.

For example, for a distance dimension on the display, such as the length of a parallelepiped along a particular axis, the minimum and maximum plot values correspond to the minimum and maximum distances, respectively, that can be shown on the display. For a dimension represented by color, various colors are placed in an order, and the minimum and maximum values of this dimension may be represented by the colors at the beginning and end of this order, respectively. For example, the colors of the visible spectrum may be arranged in the order of the wavelengths of the light that these colors reflect, with red being used to represent the minimum value of this dimension, and violet being used represent the maximum value of the dimension. The analyst must likewise define the minimum and maximum values of other, more obscure parameters, such as the shape of an ear in a cartoon figure, that are also used to represent a real life dimension or parameter.

Thus, three types of data ranges are associated with each real life dimension used with the data processing system of the present invention. These data ranges are:
(1) the absolute minimum and maximum values for the raw data value,
(2) the minimum and maximum values for each of the regions into which the range between these absolute minimum and maximum values are divided, and
(3) the minimum and maximum values for the image parameter used to represent the real life dimension.

For example, one of the real life parameters may be the air speed of an aircraft in flight, and the absolute minimum and maximum acceptable values for the raw data value may be 0 and 5,000 knots. For a particular group of applications, this range may be separated into three regions: 0 to 100 knots, 100 to 1,200 knots, and 1,200 to 5,000 knots, with bad data flags assigned to the first and third of these regions, and a scale factor of one assigned to the second of the regions. Finally, for one specific application, the image parameter used to represent this real life parameter may have minimum and maximum plot values that represent, respectively, 250 and 350 knots.

Preferably, all three sets of limits are provided to the data processing system in the units in which the raw data values are measured. The third of these sets of limits is associated with the presentation of the display; and, as represented by block 120 of FIG. 10, the data processing system is provided with the appropriate function to convert the provided data to the corresponding pixel units of the display. In the above example, the speed of the airplane may be represented by the height of a bar, and minimum and maximum values for the height of the bar may be given to the data processing system in terms of knots. The data processing system may be programmed to convert these given values to pixel units so that, for instance, if the minimum and maximum displayed values for the speed of the airplane are 250 and 350 knots, respectively, the minimum and maximum height of the displayed bar are 50 and 70 pixel units, respectively.

The data processing system 10 preferably uses two modes to determine the minimum and maximum plot values for each dimension of the k-vector. In a first mode, referred to as "manual" and represented in FIG. 10 by block 122, the analyst provides the minimum and maximum plot values. For instance, in the above example, the analyst may provide the data processing system with values of 250 knots and 350 knots as the minimum and maximum values, respectively, for the aircraft speed.

In the second mode, referred to as "automatic" and represented in FIG. 10 by block 124, the data processing system itself provides the minimum and maximum plot values from an analysis of the raw data. For example, over a period of time, a multitude of raw data values for a particular real life parameter may be supplied to the data processing system. The processor may determine the average or mean of these values, and establish the minimum and maximum plot values for the associated image parameter relative to this average or mean value. For instance, the processor may also determine the standard deviation of a group of raw data values from their mean value; and the minimum and maximum plot values for the associated image parameter may be that mean value plus and minus, respectively, two standard deviations.

Automatic plot scaling may delay the presentation of a display on the monitor 20a because it requires collecting and processing a multitude of the raw data values before the plot limits are determined. This delay may be eliminated or substantially reduced, however, by using the processor to determine continuously a current mean value, for example, of the last of a given number of collected raw data values for a particular real life parameter, and using this continuously calculated mean value to determine continuously current plot limits.

Generally, system 10 shows a display by assembling a set of data, referred to as display data or a display data set, and subsequently transmitting that data to monitor control 20b, where the data controls monitor 20a to produce the desired display. This display data set may be formed in any suitable area or section of computer system 12, or even in a peripheral device connected to the computer system. For example, as schematically shown in FIG. 1, the image data set may be assembled in an assembly section 14c of processor memory 14. With the preferred embodiment of the present invention, in which system 10 includes a multitude of graphics modules, if multiple graphics modules are being used simultaneously to form multiple display data sets, each display data set is formed in a respective one assembly area of the processor memory. For example, with reference to FIG. 8, if modules g1, g2, g3, g4 and g5 are being used simultaneously to form the first, second, third, fourth and fifth of the above-described display types, graphics module g1 may be used to assemble a first display data set in memory area $14c_1$, module $g_2$ may be used to assemble a second display data set in area $14c_2$, graphics module g3 may be used to assemble a third display data set in area $14c_3$, graphics module g4 may be used to assemble a fourth data set in memory area $14c_4$ and module g5 may be used to assemble a fifth display data set in memory area $14c_5$.

Each shown display is comprised of two parts: a first component that is a frame or framework for the display; and a second component that includes image variables, built on or around that frame, and that represent data from the k-vectors. For example, for a display that shows points on a conventional x-y coordinate system, the frame is simply two orthogonal lines, one to represent the x-axis and the other to represent the y-axis. For more complicated types of displays, other frames or frameworks are used.

To form a display data set, the analyst selects the type of plot or display that the data set is to be used to display, as represented by block 130 in FIG. 10. A number of unique patterns or formats have been discussed above, ranging from cartoon faces to parallelpipeds to Lissajous patterns, and any of these formats may be used in the present invention. Preferably, system 10 has the ability to produce at least two types of displays: a first, represented by box 132 in FIG. 10, shows points on a conventional x-y coordinate system, and a second, represented by box 134 in FIG. 10, comprises a plurality of colored parallelpipeds.

Selecting the type of display to represent the data in the k-vectors is a function referred to as type selection. Generating the actual data that is subsequently transmitted to control monitor 20a and to represent the data in the k-vectors is a function referred to as display generation and represented in FIG. 10 by block 136.

When the analyst selects the type of display that the data set is to be used to show, system 10 automatically places in assembly area 16c the appropriate data to form the frame of the display, as represented by box 140 in FIG. 10. Then, as represented by box 142, data is processed from the k-vectors and into area 14c to add to this area the data needed to generate on monitor 20a the particular images associated with the k-vectors. For instance, if the k-vectors are to be represented by a display comprising a multitude of points plotted on an x-y graph, first, data needed to show the x and y axes are added to assembly area 14c, and then data needed to illuminate the proper points on the display to represent the elements of the k-vectors are processed into area 14c from the k-vectors. Alternatively, if each k-vector is represented by a colored parallelpiped on the display, data needed to illuminate the proper areas on the monitor are processed into area 14c from the k-vectors.

Preferably, the image data processed into a display data set from a set of corresponding k-vectors is added to the display data set in the order in which the k-vectors are formed. Hence, consider three 1k-vectors used to form a particular data set. The image data processed from the first formed 1k-vector is added first to the display data set, the image data processed from the second formed 1k-vector is added second to the display data set, and the image data processed from the third formed 1k-vector is added third to the display data set. Moreover, the image data processed into a display data set from each k-vector is removed from that display data set after the display data has been in the image data set a preset length of time. Thus, in effect, as new k-vectors are formed and data to represent these k-vectors are added to the display data set, data representing older k-vectors are removed from the display data set, as represented by box 144 in FIG. 6.

If desired, as represented by block 146 in FIG. 10, data may also be added to the display data set to show on the display any annotation desired by the analyst. Preferably, each display includes:

(1) the name of each real life parameter represented on the display, and the name of the image parameter that represents this real life parameter. For instance, a display may include the annotation that radar pulse duration is plotted as color saturation.

(2) the minimum and maximum plot value.

(3) one or two comments added by the analyst.

These annotations are represented in FIG. 10 by boxes 150, 152 and 154, respectively.

PRESENTING THE DISPLAY TO THE ANALYST

Any suitable format may be used to present the display to the analyst. Preferably, though, as represented by block 156 in FIG. 13 and as pictorially illustrated in FIG. 14, the video screen is separated into five viewing areas 156a–e, a process referred to as formatting the video screen.

A first of these areas 156a, referred to as the main or primary viewing area, is for the display itself. This area shows the colored parallelpipeds, or the cartoon faces that represent the real life situation being analyzed. A second display area 156b is reserved for the above-described annotations, and a third viewing area 156c lists the m possible displays that may be shown to represent a real life situation. A fourth viewing area 156d is reserved for alphanumerics and textual information, other than the above-described annotations that may be presented to the analyst by the data processing system. Finally, since the analyst can communicate with the data processing system, for example, via keyboard 28 and joystick 26, a fifth portion 156e of the video screen is allocated for showing or echoing, data communicated to the system from the analyst. Separating the screen into these five areas is represented schematically in FIG. 13 by blocks 160, 162, 164, 166 and 170, respectively. Preferably, these viewing areas are all on one video screen; although alternatively, the viewing areas may be presented on a plurality of video screens.

The position, size and shape of each of these five viewing areas may be selected or adjusted by the analyst both before and while the displays are shown via control means 22. Preferably, each of these areas has a generally rectangular shape, the length and width of each area is continuously adjustable, and the size of each area may be made insignificantly small.

Figure 13:
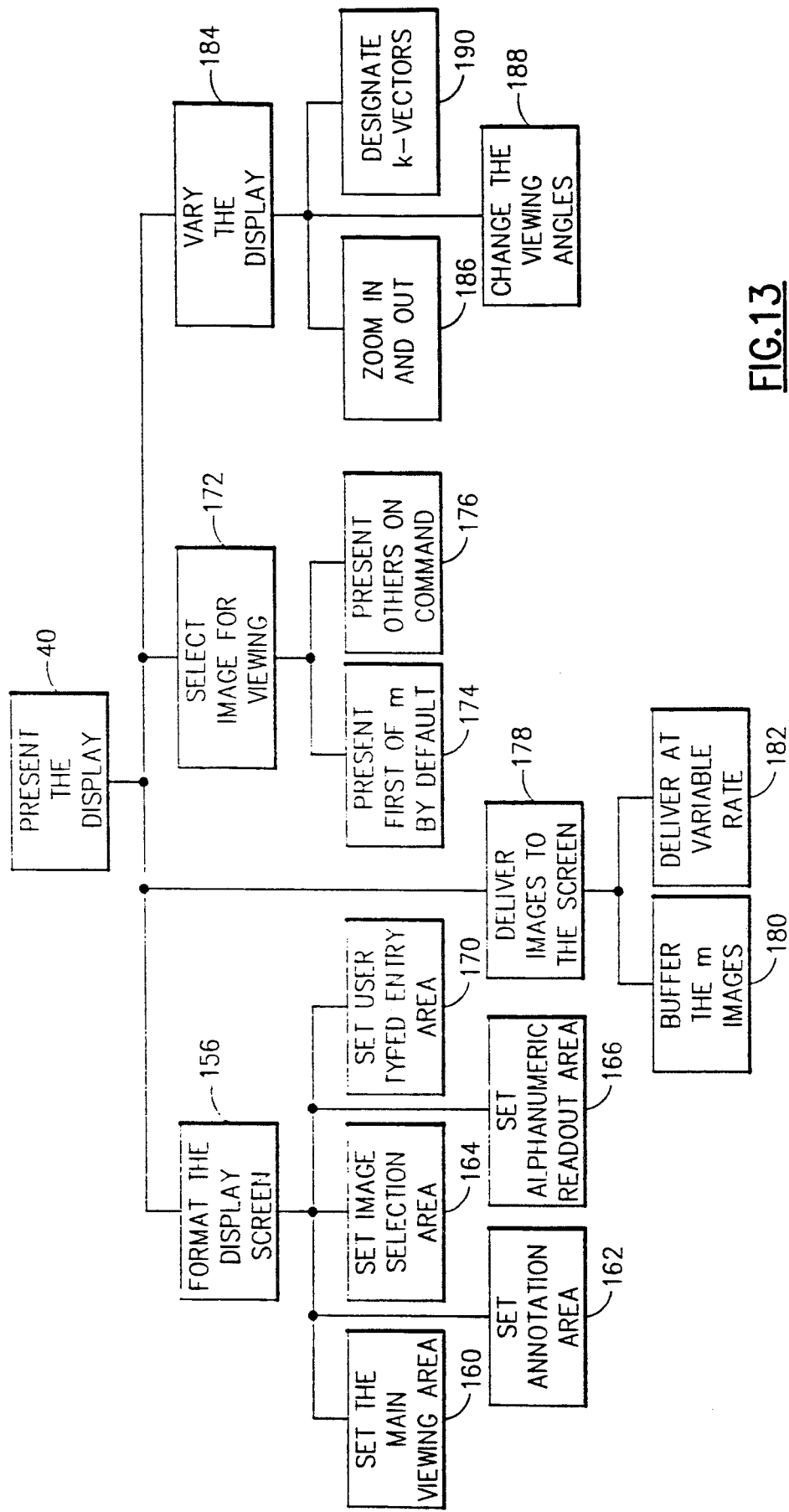
FIG. 13 is a fourth table listing various steps that may be taken to display the formed image.

Next, the analyst selects the specific display or displays to be shown from the m display data sets formed using the m k-vectors, as represented by box 172 of FIG. 13. Any suitable control or program may be used to select the desired display or displays. For example, with one embodiment, only one display is shown at any given time; but preferably, the analyst can quickly change which one of the m related display data sets is used to generate the shown display. Moreover, a name is given for each type of display that may be shown on the screen, and these names are themselves shown on a monitor screen, specifically, in the third of the above-discussed screen areas, and an analyst can show a particular display by simply selecting one of the display names.

System 10 is designed so that if the analyst does not manually select a particular display for viewing, a display is automatically selected by the data processing system itself, as represented by box 174 in FIG. 13. Other displays are presented upon command, as represented by box 176 of FIG. 13, although this command may come either from the analyst or from the data processing system. Because all m display data sets are formed in parallel, the display that is actually shown at any given time may be changed very quickly.

Once formatted, monitor 20a is ready to show the selected display; and as represented by box 178 of FIG. 13, this is done by transmitting to monitor control 20b the assembled display data set from assembly area 14c, and image data subsequently added to that same display data set. Preferably, however, before being transmitted to monitor controller 20b, the image data are transmitted to and written in a buffer or holding area 20c, as represented by box 180 of FIG. 13. This data are transmitted to buffer area 20c at the rate at which the image data is generated from the k-vectors; and the image data is transmitted to monitor controller 20b and thence displayed on monitor 20a, at a variable rate that is controlled by the analyst via control means 22, as represented by box 182 of FIG. 13. This latter rate may be less than, equal to, or greater than the rate at which the image data are written into the buffer area 20c.

For instance, normally a display is changed on the monitor at the same rate at which the image data are transmitted to the buffer area. However, the analyst may want to decrease the rate at which the display is being changed, and this can be done by decreasing the rate at which the image data are transmitted to monitor controller 20b. If this is done, the amount of image data in the buffer area may increase; and to decrease the amount of data therein, the analyst may increase the rate at which the images are shown on monitor 20c. Preferably, the image data are maintained in buffer 20c, or in monitor control 20b, for at least a limited period of time so that the analyst can show previous changes in the reverse order in which they occurred, in effect allowing the analyst to reverse the image changes.

Initially, the displays are shown on the video screen in conventional ways. For example, an x-y scatter plot is presented with the x-axis plotted horizontally, and the y-axis presented vertically, and with the grid formed by the x- and y-axes filling the main viewing area of the screen. The analyst, however, is preferably permitted to vary this view quickly and easily, as represented by block 184 of FIG. 13. For example, the analyst may want to pay particular attention to a selected area of a display until he is satisfied with his understanding of the area. To do this, the analyst may enlarge a selected area of a display and, after he has developed a thorough understanding of this area, return the area to its original size, as represented by block 186 of FIG. 13.

When the display shown on the viewing or display monitor is a view of a three-dimensional object, such as a parallelpiped, preferably the analyst is also able to change the angle at which that object is viewed, as represented by block 188 of FIG. 13. Any suitable graphics control means may be employed on system 10 to provide the analyst with the above-discussed enlarging and viewing angle changing capabilities.

In some cases, an analyst may be particularly interested in one specific data report from which a particular k-vector was formed. Therefore, preferably system 10 is provided with a function that will enable the display means, upon request from the analyst, to show exact digital values for the elements of that k-vector, as represented by block 186 of FIG. 13.

CONTROLLING THE SYSTEM

Preferably, an analyst is provided with considerable control over many or even most of the steps performed by computer system 10, allowing the analyst to make large and small changes to the operation of the system according to the analyst's needs and perceptions. These needs and perceptions, in turn, are constantly influenced by the analyst's perception of the output. Thus, the interaction between the analyst and computer system 10 involves a cycle in which the system produces a display, that display is perceived by the analyst, the analyst adjusts the operation of system 10, and the system in response adjusts its display to present a new display.

Figure 15:
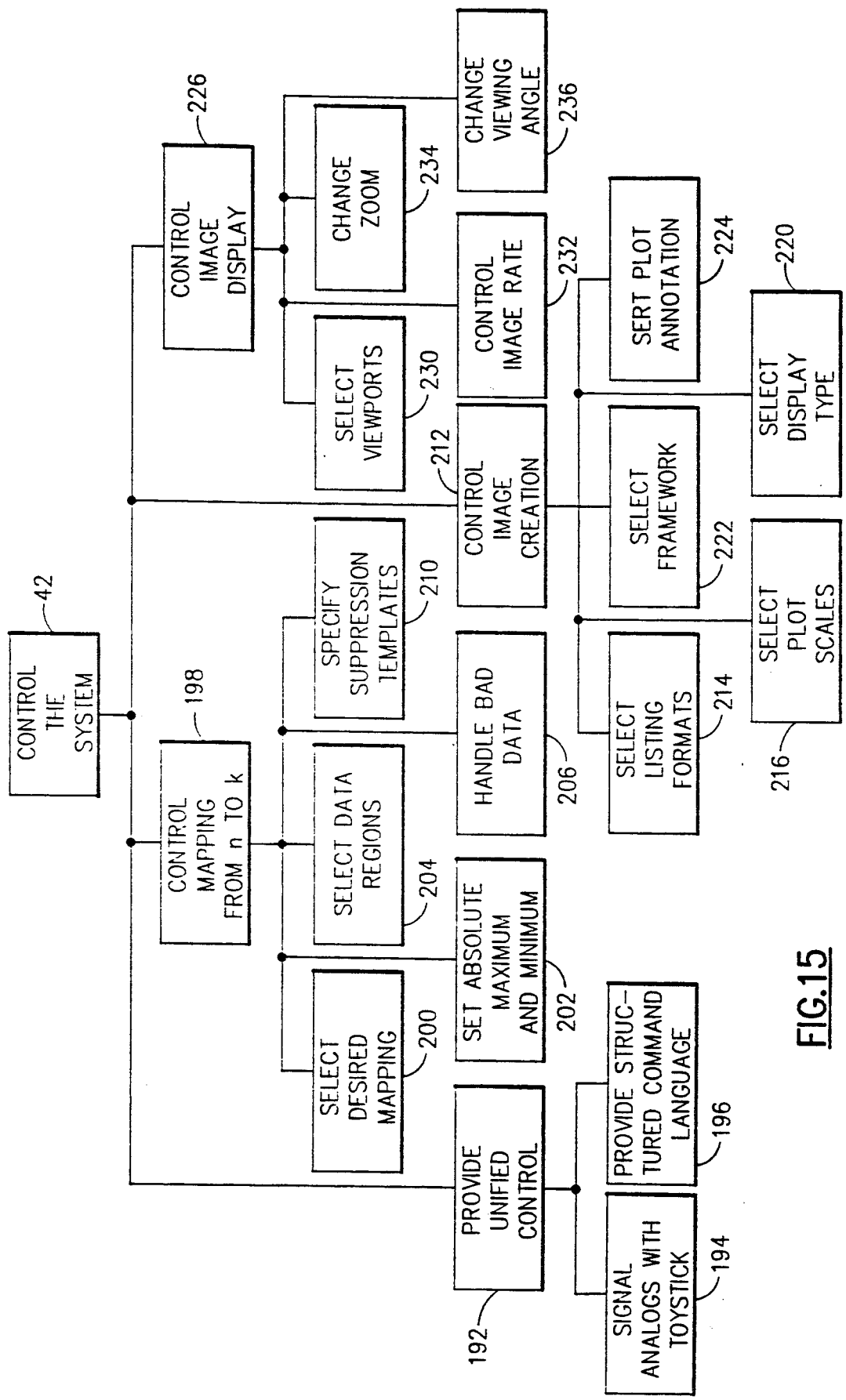
FIG. 15 is a table identifying various specific steps of the data processing and display system that may be directly controlled or selected by an operator.

Preferably, as represented by block 192 of FIG. 15, this control is implemented through the coordinated use of keyboard 24 and joystick 26, each of which has its special advantages. The joystick allows the analyst to have analog control over many features, as represented by block 194 in FIG. 15. For example, various lists, or menus, may be shown on monitor 20a, such as the names of the vector templates, possible minimum and maximum plot values; and the monitor may be provided with a cursor that is moved dynamically across the monitor, via manipulation of the joystick, to help select items from those lists. The keyboard enables the analyst to use a structured command language to transmit discreet information to processor 16 and monitor 20a as represented by block 196 in FIG. 15. Such a structured command language is often more useful than communication via a joystick. A suitable integration of both the joystick and the keyboard allows the analyst quick, flexible and extensive control over the display and operation of system 10.

Consider now, for example, the specific case where the analyst controls the character of the display. First, as represented by block 198 of FIG. 15, the analyst controls the mappings of the n-vectors into the k-vectors. In particular, the analyst selects the mapping algorithms, chooses the minimum and maximum acceptable raw data values, and separates the range between those absolute minimum and maximum values into one or more data regions, as represented by blocks 200, 202 and 204 of FIG. 15, respectively. In addition, as represented by blocks 206 and 210, the analyst can identify which, if any, of those regions represents bad data and can discard selected whole k-vectors.

The analyst can also control the creation of the displays, as represented by block 212. More specifically, the analyst can select the format for any tabular lists of data, set the plot limits for graphical displays, and specify the type of display to be shown, as represented by blocks 214, 216 and 220, respectively, of FIG. 15. Also, the analyst can select the framework for the specified display, and select the form and content for any plot annotations, as represented by blocks 222 and 224, respectively.

Figure 14:
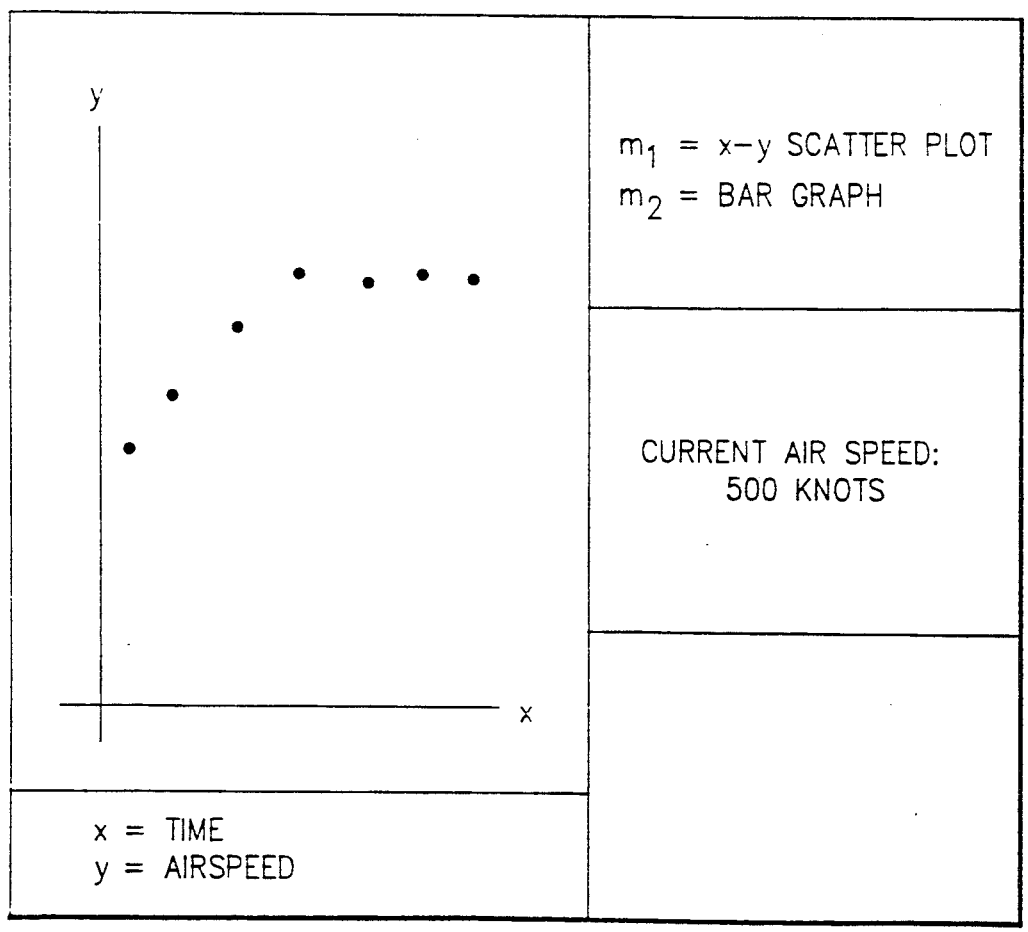
FIG. 14 show how a video screen may be separated into multiple areas to display data according to the present invention.

Finally, the analyst can control the actual view of the display, as represented by block 226 of FIG. 14. For instance, as represented by block 230, the analyst can select the viewing area for the display and the size and location of that viewing area. Moreover, the rate at which the display is being changed can be slowed or accelerated, as represented by block 232, depending upon the analyst's perception of the displayed data. If any spacial segment of the image is worthy of closer consideration, the analyst can enlarge that segment, or change the angle at which a simulated object is being shown, as represented by blocks 234 and 236 of FIG. 15.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method of processing and displaying data, comprising obtaining a multitude of raw data values for each of a multitude of first parameters;

assembling a multitude of n-vectors in succession from the raw data values, including
  i) generating a multitude of input signals representing the raw data values,
  ii) conducting the input signals to a processing system,
  iii) transforming the input signals into digital data values and assembling the digital data values into the multitude of n-vectors in succession by the processing system and according each n-vector a plurality of the digital data values whereby each data value of each n-vector is associated with at least one of the raw data values, and each data value of each n-vector corresponds to a respective one data value of each of the other n-vectors, by a process including the steps of
    1) establishing signals for the data values of the n-vectors according to a first set of predetermined procedures, and
    2) establishing the signals for the data values of the n-vectors that correspond to each other according to an identical one of said first set of predetermined procedures assembling a multitude of k-vectors in succession from the data values of the n-vectors by the processing system, and according each k-vector a plurality of data values whereby each data value of each k-vector corresponds to a respective one data value of each of the other k-vectors, by a process including the steps of
  i) establishing signals for the data values of the k-vectors according to a second set of predetermined procedures,
  ii) establishing the signals for the data values of each k-vector from the data values of a respective one, associated n-vector, and
  iii) establishing the signals for the data values of the k-vectors that correspond to each other according to an identical one of said second set of predetermined procedures;

assembling a multitude of image data sets of a given type in succession from the data values of the k-vectors by the processing system, and according each image data set a plurality of variable image parameters whereby each parameter of each image data set of the given type is established as identical to a respective one parameter of each of the other image data sets of the given type by a process including the steps of
  i) obtaining signals delineating the variable parameters of each image data set from the data values of a respective one of the k-vectors, and
  ii) obtaining signals delineating the identical parameters of the image data sets from corresponding data values of the k-vectors;

conducting the image data sets to a monitor controller;

transforming image data sets by the monitor controller into monitor control signals; and applying the monitor control signals to a monitor to produce thereon displays of a multitude of images of a given type.

2. A method according to claim 1, wherein the processing system includes a memory having first and second sections, the first section of the memory has a multitude of addressable memory locations, each of the first parameters is associated with one of the addressable memory locations, each input signal represents a value for an associated one of the first parameters, and wherein:

the transforming step includes the step of transforming each input signal into a respective one of the digital data values whereby each digital data value represents a value for an associated one of the first parameters; and the steps of assembling the n-vectors includes the step of, each time a digital data value is obtained for one of the first parameters, placing the obtained value for the parameter in the associated memory location.

3. A method according to claim 2, wherein the step of assembling the k-vectors includes the step of transferring values in the first memory section to the second memory section whenever, for one of a selected group of the first parameters, a digital data value for the one parameter is in the associated memory location and an attempt is made to place another data value for the same one parameter in the same associated memory location.

4. A method according to claim 2, wherein the step of assembling the k-vectors includes the step of transferring values in the first memory section to the second memory section; and after a given length of time, repeating the transferring step.

5. A method according to claim 1, wherein the step of assembling the n-vectors includes the step of computing selected data values of each n-vector from other data values thereof.

6. A method according to claim 1, wherein the step of assembling the k-vectors includes the steps of:

for each of at least selected data values of each k-vector establishing minimum and maximum values for the data value; and determining the data value of the k-vector from an associated one data value of the associated n-vector, including
  i) establishing a predetermined given value as the data value if the k-vector of said one associated component of the associated n-vector is less than the established minimum value for the k-vector data value, and
  ii) establishing a predetermined given value as the data value of the k-vector if said one associated data value of the associated n-vector is greater than the established maximum value for the k-vector data value.

7. A method according to claim 6, wherein the step of assembling the k-vectors includes the steps of:

specifying a data range for each data value of the k-vectors; and disregarding a given k-vector when all of the data values thereof are within the respective specified data ranges.

8. A method according to claim 1, wherein each image parameter is associated with a respective one of the first parameters, and the image parameters and first parameters have names, and wherein the applying step includes the step of displaying, for each image parameter in each displayed image, (i) the name of the image parameter, and (ii) the name of the associated first parameter.

9. A method according to claim 8, wherein each first parameter has minimum and maximum values, and the displaying step further includes the step of displaying the minimum and maximum values of the first parameters associated with the image parameters of the displayed images.

10. A method according to claim 1, for use with a video screen having a plurality of sections, and wherein the displaying step includes the steps of:
    displaying the images in a first of the sections; and
    showing information about the displayed images in a second of the sections.

11. A method of processing and displaying data, comprising:
    obtaining a multitude of raw data values for each of a multitude of first parameters;
    assembling a multitude of n-vectors in succession from the raw data values, including
    i) generating a multitude of input signals representing the raw data values,
    ii) conducting the input signals to a processing system,
    iii) transforming the input signals into digital data values and assembling the digital data values into a multitude of n-vectors in succession by the processing system, and according each n-vector a plurality of the digital data values whereby each data value of each n-vector is associated with at least one of the raw data values, and each data value of each n-vector corresponds to a respective one data value of each of the other n-vectors, by a process including the steps of
        1) establishing signals for the data values of the n-vectors according to a first set of predetermined procedures, and
        2) establishing signals for the data values of the n-vectors that correspond to each other according to an identical one of said first set of predetermined procedures;
    from the data values of the n-vectors, assembling a multitude of $k_1$-vectors in succession and assembling a multitude of $k_2$-vectors in succession, according each $k_1$-vector a plurality of data values whereby each data value of each $k_1$-vector corresponds to a respective one data value of each of the other $k_1$-vectors, and according each $k_2$-vector a plurality of data values whereby each data value of each $k_2$-vector corresponds to a respective one data value of each of the other $k_2$-vectors by a process including the steps of
        i) establishing signals for the data values of the $k_1$-vectors and the data values of the $k_2$-vectors according to a second set of predetermined procedures,
        ii) establishing signals for the data values of each $k_1$-vector from the data values of a respective one, associated n-vector,
        iii) establishing signals for the data values of the $k_1$-vectors that correspond to each other according to an identical one of said second set of predetermined procedures,
        iv) establishing signals for the data values of each $k_2$-vector from the data values of a respective one, associated n-vector, and
        v) establishing signals for the data values of the $k_2$-vectors that correspond to each other according to an identical one of said second set of predetermined procedures;
    assembling a multitude of image data sets of a first type in succession from the data values of the $k_1$-vectors by the processing system, and according each image data set of the first type a plurality of variable image parameters whereby each parameter of each image data set of the first type is established as identical to a respective one parameter of each of the other image data sets of the first type by a process including the steps of
        i) obtaining signals delineating the variable parameters of each formed image data set of the first type from the data values of a respective one of the $k_1$-vectors, and
        ii) obtaining signals delineating the identical parameters of the image data sets of the first type from corresponding data values of the $k_1$-vectors;
    assembling a multitude of image data sets of a second type in succession from the data values of the $k_2$-vectors by the processing system, and according each image data set of the second type a plurality of variable image parameters whereby each parameter of each image data set of the second type is established as identical to a respective one parameter of each of the other image data sets of the second type by a process including the steps of
        i) obtaining signals delineating the variable parameters of each formed image data set of the second type from the data values of a respective one of the $k_2$-vectors, and
        ii) obtaining signals delineating the identical parameters of the image data sets of the second type from corresponding data values of the $k_2$-vectors;
    conducting image data sets of the first and second type to a monitor controller;
    transforming image data sets by the monitor controller into monitor control signals; and
    applying the monitor control signals to a monitor to produce thereon displays of a multitude of images of first and second given types.

12. A method according to claim 11, wherein the displaying step includes the step of displaying a respective name for each of the first and second given types of images.

13. A method according to claim 11, wherein:
    the step of transforming the image data sets into monitor control signals includes the steps of
        i) transforming the image data sets of the first type into a first set of monitor control signals, and
        ii) transforming the image data sets of the second type into a second set of monitor control signals; and
    the applying step includes the step of
        i) over a given period of time, applying only the first set of monitor control signals to the monitor to produce thereon displays of only images of the first type, and ii) subsequently applying only the second set of monitor control signals to the monitor to produce thereon displays of only images of the second type.

14. Apparatus for processing and displaying data, comprising:
   sensing means to sense a multitude of first parameters, and to generate a multitude of input signals representing raw data values of each of said multitude of first parameters;
   processing means connected to the sensing means to receive said input signals therefrom, and including
   i) n-vector assembling means to transform said input signals into digital data values and to assemble the data values into a multitude of n-vectors in succession, each n-vector having a plurality of data values whereby each data value of each n-vector is associated with at least one of the raw data values, and each data value of each n-vector corresponds to a respective one data value of each of the other n-vectors, the n-vector forming means including means to form the data values of the n-vectors according to a first set of predetermined procedures, and to form the data values of the n-vectors that correspond to each other according to an identical one of said first set of predetermined procedures;
   ii) k-vector assembling means to form a multitude of k-vectors in succession from the data values of the n-vectors, each k-vector having a plurality of data values whereby each data value of each k-vector corresponds to a respective one data value of each of the other k-vectors, the k-vector forming means including means (a) to establish signals for the data values of the k-vectors according to a second set of predetermined procedures, (b) to obtain signals delineating the data values of each k-vector from the data values of a respective one, associated n-vector, and (c) to establish signals for the data values of the k-vectors that correspond to each other according to an identical one of said second set of predetermined procedures; and
   iii) image data assembling means to assemble a multitude of image data sets of a given type in succession from the data values of the k-vectors, each image data set having a plurality of variable image parameters whereby each parameter of each image data set of the given type is identical to a respective one parameter of each of the other image data sets of the given type, the image data assembling means including means to obtain signals delineating the variable parameters of each image data set from the data values of a respective one of the k-vectors, and to obtain signals delineating the values for identical parameters of the image data sets from corresponding data values of the k-vectors;
   a monitor to display images; and
   a monitor controller connected to the processing means and to the monitor, to receive the image data sets from the processing means, to transform image data sets into monitor control signals, and to apply the monitor control signals to the monitor to produce thereon a multitude of images of a given type.

15. Apparatus according to claim 14, wherein:
   each digital data value is a value for one of the first parameters;
   the n-vector assembling means includes
   i) a first memory section having a multitude of addressable memory locations, each of the first parameters being associated with one of the addressable memory locations, and
   ii) means to place the digital data values for each of the first parameters in the addressable memory location associated with the first parameter; and
   the k-vector assembling means includes
   i) a second memory section, and
   ii) means to transfer digital data values in the first memory section to the second memory section.

16. Apparatus according to claim 15, wherein the means to transfer values in the first memory section to the second memory section includes means to transfer values in the first memory section to the second memory section whenever, for selected ones of the first parameters, a data value for the first parameter is in the associated memory location and an attempt is made to place another data value for the same first parameter in the same associated memory location.

17. Apparatus according to claim 15, wherein the means to transfer values in the first memory section to the second memory section includes means to transfer values in the first memory section to the second memory section, and after a given length of time, to again transfer values in the first memory section to the second memory section.

18. Apparatus according to claim 14, wherein the k-vector assembling means includes means to establish minimum and maximum values for each of at least selected data values of each k-vector.

19. Apparatus according to claim 14, wherein the image data values means includes means to establish minimum and maximum values for each of the image parameters.

* * * * *

UNITED STATES PATENT AND TRADEMARK OFFICE
CERTIFICATE OF CORRECTION

PATENT NO. : 5,121,469

DATED : June 9, 1992

INVENTOR(S) : Paul T. Richards, et al.

It is certified that error appears in the above-identified patent and that said Letters Patent is hereby corrected as shown below:

On the Title Page, Section [22]: "Jun. 20, 1989" should read as --Mar. 20, 1989--

Column 2, line 9: "problem" should read as --problem.--

Column 6, line 17: "show" should read as --shows--

Signed and Sealed this

Twelfth Day of October, 1993

Attest:

BRUCE LEHMAN

Attesting Officer

Commissioner of Patents and Trademarks